US012573290B2

(12) United States Patent
Le Houerou et al.

(10) Patent No.: US 12,573,290 B2
(45) Date of Patent: Mar. 10, 2026

(54) ROAD SPACE COLLECTIVE PERCEPTION MESSAGE WITHIN AN INTELLIGENT TRANSPORT SYSTEM

(71) Applicant: CANON KABUSHIKI KAISHA, Tokyo (JP)

(72) Inventors: Brice Le Houerou, Acigne (FR); Isabelle Morvan, Chantepie (FR); Eric Nassor, Thorigne-Fouillard (FR); Hervé Ruellan, Rennes (FR); Julien Sevin, Saint Aubin du Cormier (FR); Lionel Tocze, Saint Domineuc (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 18/052,160

(22) Filed: Nov. 2, 2022

(65) Prior Publication Data

US 2023/0169853 A1 Jun. 1, 2023

(30) Foreign Application Priority Data

Nov. 4, 2021 (GB) ...................................... 2115836
Dec. 15, 2021 (GB) ...................................... 2118194

(51) Int. Cl.
*G08G 1/01* (2006.01)
*G08G 1/04* (2006.01)
*G08G 1/14* (2006.01)

(52) U.S. Cl.
CPC ......... *G08G 1/0133* (2013.01); *G08G 1/0112* (2013.01); *G08G 1/0116* (2013.01); *G08G 1/04* (2013.01); *G08G 1/141* (2013.01)

(58) Field of Classification Search
CPC .... G06V 20/54; G08G 1/0112; G08G 1/0116; G08G 1/0133; G08G 1/04; G08G 1/093; G08G 1/096716; G08G 1/096783; G08G 1/096791; G08G 1/141; G08G 1/16; H04W 4/021; H04W 4/40
See application file for complete search history.

(56) References Cited

U.S. PATENT DOCUMENTS

| | | | | |
|---|---|---|---|---|
| 10,373,494 | B1 * | 8/2019 | Krysiuk | G06Q 10/00 |
| 10,841,761 | B2 | 11/2020 | Zhang et al. | |
| 2011/0298603 | A1 | 12/2011 | King et al. | |
| 2019/0268447 | A1 | 8/2019 | Yang et al. | |
| 2019/0325751 | A1 * | 10/2019 | Altintas | G05D 1/0077 |
| 2019/0339082 | A1 | 11/2019 | Doig | |

(Continued)

FOREIGN PATENT DOCUMENTS

| | | | | |
|---|---|---|---|---|
| CA | 3085263 | A1 * | 1/2021 | G08G 1/056 |
| EP | 3691300 | A1 | 8/2020 | |

(Continued)

OTHER PUBLICATIONS

CAR 2 CAR Communication Consortium, Triggering Conditions and Data Quality Pre-Crash Information, XP093024322.

(Continued)

*Primary Examiner* — Babar Sarwar
(74) *Attorney, Agent, or Firm* — Canon U.S.A., Inc. IP Division

(57) ABSTRACT

A method of communication in an Intelligent Transport System, ITS, comprising, at an originating ITS station reporting in a collective perception message an element describing a space representing a specific area of a road topology.

1 Claim, 14 Drawing Sheets

(56) References Cited

U.S. PATENT DOCUMENTS

| | | | | |
|---|---|---|---|---|
| 2020/0164844 | A1 | 5/2020 | Jung et al. | |
| 2021/0067926 | A1* | 3/2021 | Hwang | H04W 4/023 |
| 2021/0082210 | A1 | 3/2021 | Sakr | |
| 2021/0129862 | A1 | 5/2021 | Kim | |
| 2022/0005353 | A1* | 1/2022 | Hwang | H04W 4/40 |
| 2022/0103986 | A1* | 3/2022 | Hwang | H04W 4/44 |
| 2022/0132524 | A1 | 4/2022 | Mueck | |
| 2022/0150333 | A1 | 5/2022 | Nylander | |
| 2022/0332350 | A1 | 10/2022 | Jha | |
| 2023/0104083 | A1* | 4/2023 | Morvan | G08G 1/096791 |

FOREIGN PATENT DOCUMENTS

| | | | | |
|---|---|---|---|---|
| EP | 3767976 | A1 * | 1/2021 | H04W 4/38 |
| EP | 3829200 | A2 | 6/2021 | |
| GB | 2611540 | A | 4/2023 | |
| JP | 2008015316 | A | 1/2008 | |
| JP | 2011158636 | A | 8/2011 | |
| JP | 2018530810 | A | 10/2018 | |
| JP | 2018534692 | A | 11/2018 | |
| JP | 2021522604 | A | 8/2021 | |
| WO | 2018100661 | A1 | 6/2018 | |
| WO | 2020145438 | A1 | 7/2020 | |
| WO | WO-2020257642 | A1 * | 12/2020 | H04W 4/12 |
| WO | 2021252174 | A1 | 12/2021 | |

OTHER PUBLICATIONS

Intelligent Transport Systems (ITS); Vehicular Communications; Basic Set of Applications; Part 2: Specification of Cooperative Awareness Basic Service; ETSI EN 302 637-2 v1.4.1; (Apr. 2019).

Intelligent Transport System (ITS); Vehicular Communications; Basic Set of Applications; Specification of the Collective Perception Service, ETSI TS 103 324 V0.0.18 (May 2020).

Intelligent Transport Systems (ITS); Communications Architecture, ETSI EN 302 665 V1.1.1 (Sep. 2010).

Intelligent Transport Systems—Communications access for land mobiles (CALM)—Architecture, ISO 21217, second Edition, Apr. 1, 2014.

Intelligent Transport System (ITS); Vehicular Communications; Basic Set of Applications; Specification of the Collective Perception Service, ETSI TS 103 324 V0.0.20 (Feb. 2021).

Intelligent Transport Systems (ITS); Vehicular Communications; Basic Set of Applications; Analysis of the Collective Perception Service (CPS); Release 2; ETSI TR 103 562 V2.1.1 (Dec. 2019).

Intelligent Transport System (ITS); Vehicular Communications; Basic Set of Applications; Specification of the Collective Perception Service; ETSI TS 103 324 V0.0.22 (May 2021).

Intelligent Transport System (ITS); Vehicular Communications; Basic Set of Applications; Part 2: Specification of the Awareness Basic Service, ETSI EN 637-2 V1.4.1, (Jan. 2019).

Intelligent Transport Systems (ITS); Vehicular Communications; Basic Set of Applications; Part 3: Specifications of Decentralized Environmental Notification Basic Service, ETSI EN 302 637-3 V1.3.1 (Apr. 2019).

Intelligent Transport Systems (ITS); Vehicular Communications; Basic Set of Applications; Facilities layer protocols and communication requirements for infrastructure services, ETSI TS 103 301 V1.3.1 (Feb. 2020).

* cited by examiner

ROAD SPACE COLLECTIVE PERCEPTION MESSAGE WITHIN AN INTELLIGENT TRANSPORT SYSTEM

PRIORITY CLAIM/INCORPORATION BY REFERENCE

This application claims the benefit under 35 U.S.C. § 119(a)-(d) of United Kingdom Patent Application No. 2115836.5, filed on Nov. 4, 2021 and entitled "ROAD SPACE COLLECTIVE PERCEPTION MESSAGE WITHIN AN INTELLIGENT TRANSPORT SYSTEM" and of United Kingdom Patent Application No. 2118194.6, filed on Dec. 15, 2021 and entitled "ROAD SPACE COLLECTIVE PERCEPTION MESSAGE WITHIN AN INTELLIGENT TRANSPORT SYSTEM". The above cited patent applications are incorporated herein by reference in its entirety.

FIELD OF THE DISCLOSURE

The present disclosure relates generally to Intelligent Transport Systems (ITS) and more specifically to Cooperative Intelligent Transport Systems (C-ITSs).

BACKGROUND OF DISCLOSURE

Cooperative Intelligent Transport Systems (C-ITSs) is an emerging technology for future transportation management that aims at improving road safety, traffic efficiency and drivers experience.

Intelligent Transport Systems (ITS), as defined by the European Telecommunications Standards Institute (ETSI), include various types of communication such as:

communications between vehicles (e.g., car-to-car), and communications between vehicles and fixed locations (e.g., car-to-infrastructure).

C-ITSs are not restricted to road transport. More generally, C-ITSs may be defined as the use of information and communication technologies (ICT) for rail, water and air transport, including navigation systems. Such various types of C-ITSs generally rely on radio services for communication and use dedicated technologies.

C-ITSs are subject to standards, specified for each country and/or territory where C-ITSs are implemented. In Europe, the European Telecommunications Standards Institute (ETSI) is in charge of the elaboration of the specifications forming the standards to which C-ITSs are subjected.

Cooperation within C-ITSs is achieved by exchange of messages, referred as to ITS messages, among ITS stations (denoted ITS-Ss). The ITS-Ss may be vehicles, Road Side Units (RSUs), Vulnerable Road Users (VRUs) carrying an ITS equipment (for instance included in a smartphone, a GPS, a smart watch or in a cyclist equipment), or any other entities or infrastructures equipped with an ITS equipment, as well as central subsystems (back-end systems and traffic management centres).

C-ITSs may support various types of communications, for instance between vehicles (vehicle-to-vehicle or "V2V"), referring to all kinds of road users, e.g. car-to-car, or between vehicles and fixed locations such as vehicle-to-infrastructure or "V2I", and infrastructure-to-vehicle or "I2V", e.g., car-to-infrastructure.

Such messages exchanges may be performed via a wireless network, referred to as "V2X" (for "vehicle" to any kind of devices) networks, examples of which may include 3GPP LTE-Advanced Pro, 3GPP 5G or IEEE 802.11p technology.

Exemplary ITS messages include Collective Perception Messages (CPMs), Cooperative Awareness Messages (CAMs) and Decentralized Environmental Notification Messages (DENMs). The ITS-S sending an ITS message is named "originating" ITS-S.

EN 302 637-2 (V1.4.1 of April 2019) defines the Cooperative Awareness Basic Service through which an ITS-S transmits, using broadcast CAMs, its ego-vehicle dynamics (e.g. position, speed).

EN 302 637-3 (V1.3.1 of April 2019) defines the Decentralized Environmental Notification Basic Service through which an originating ITS-S can send, using broadcast DENMs, notifications to other ITS-Ss, such as warnings or alerts. Such a message notifies an event (e.g. road hazard, driving environment, traffic condition) detected by the originating ITS-S.

ETSI TS 103 324 (V0.0.22 of May 2021) defines the Collective Perception Service through which an ITS-S having local perception sensor systems detects objects in its vicinity and transmits, using broadcast CPMs, description information (e.g. dynamics such as position and/or kinematic information) thereof. The Collective Perception service provides information about the ITS sub-system's environment such as road safety relevant objects (i.e. other road participants, obstacles and alike) detected by local perception sensors and/or free space information. For this purpose, the specified message provides generic data elements to describe detected objects in the reference frame of ITS sub-system. The CPMs are sent periodically with a period from 100 ms to 1 s depending for example on the speed of the objects sensed by the originating ITS-S.

ETSI TS 103 301 (V1.3.1 of February 2020) defines the Map Extended Message through which an ITS-S can send map including road/lane topology data and traffic maneuver, using broadcast MAPEMs. The corresponding service to MAPEM is road and Lane Topology service (RLT). It is one instantiation of the infrastructure services to manage the generation, transmission and reception of a digital topological map, which defines the topology of an infrastructure area. It includes the lane topology for e.g. vehicles, bicycles, parking, public transportation and the paths for pedestrian crossings and the allowed maneuvers within an intersection area or a road segment. Also, ISO TS19091 2016(E) defines "Cooperative ITS—Using V2I and I2V communications for applications related to signalized intersections" and more particularly the different types of road topology and the manner to describe its geometries.

Collective Perception Messages are able to deliver many information about the perceived objects and optionally about free space areas. CPMs are transmitted without relationship or hierarchy between objects. When a station wants to get information on the global situation in its neighborhood, it needs to analyze the information collected through all the received CPMs. This analysis might be time consuming for embedded devices as it is required to receive a lot of messages from independent perception results in order to get knowledge of road situation. Due to bandwidth constraints, CPMs may not convey information on all the perceived object of a station. Also, knowing only free space may not be sufficient.

A driver also has to manage his car driving to different rules depending on various road topology requiring at first a global perception to know how to handle it as an incoming situation. For example, a driver may adapt his driving more safely and stress less by knowing globally the situation under jam traffic condition, when entering on highway or when looking for a free place in car parking.

Collective Perception Service may advantageously be improved to facilitate a receiving station in determining a global perception of the road situation.

SUMMARY OF THE DISCLOSURE

The present disclosure has been devised to address one or more of the foregoing concerns.

According to the present disclosure, it is proposed to introduce a new type of object that may be signalled in a collective perception message (CPM) in addition of the existing perceived objects and free spaces. This new type of object would be a space area corresponding to a specific part of the road topology. It may be a road section, a crossing, a merging zone, for example. Some information relative to this area may be reported, like its occupancy, congestion, normal operation, for example. Accordingly, the receiving station gets at once a global information related to an area which is meaningful regarding the road situation in its neighbourhood.

In some embodiments, a hierarchy of space area may be defined for reporting different levels of global information related to a given road topology space.

According to a first aspect of the present disclosure, it is proposed a method of communication in an Intelligent Transport System, ITS, comprising, at an originating ITS station:

reporting in a collective perception message an element describing a space and comprising a field indicating the space state.

In an embodiment, the space described by the element represents a specific area of a road topology.

In an embodiment, the element is a space container.

In an embodiment, the element comprises a rule of road space corresponding to a type of the specific area.

In an embodiment, the field indicating the space state depends on the rule of road space.

In an embodiment, the element comprises a field indicating the occupancy of the space as a number of detected objects in the space.

In an embodiment, the element comprises a field indicating a level of confidence on information provided by the element.

In an embodiment, the element comprises an identifier of another space indicating that the space is a sub part of the other space.

In an embodiment, the element comprises a geographical area definition of the space.

In an embodiment, the element comprises the fields of a free space container for describing a space not containing any perceived object.

In an embodiment, the element is a container which can represent a space or a free space.

According to another aspect of the present disclosure, it is proposed a method of generation of a collective perception message in an Intelligent Transport System, ITS, comprising, at an originating ITS station:

determining a space determining a state of the space;

generating a space container describing the space and comprising a field indicating the space state; and embedding the space container in the collective perception message.

In an embodiment, the method further comprises:

determining a specific area of the road topology; and wherein the determined space represents the specific area of the road topology.

In an embodiment, the method further comprises:

determining another space representing a sub part of the specific area;

generating a space container describing the other space comprising an identifier of the space;

embedding the space container describing the other space in a collective perception message.

According to another aspect of the present disclosure, it is proposed a method of reception of a collective perception message in an Intelligent Transport System, ITS, comprising, at a receiving ITS station:

receiving the collective perception message;

obtaining an element describing a space and comprising a field indicating the space state;

determining a global perception of the road situation from information comprised in the element.

In an embodiment, the space represents a specific area of a road topology.

In an embodiment, the method further comprises:

obtaining another element describing another space representing a sub part of the specific area;

determining a detailed perception of the road situation from information comprised in the other element.

According to another aspect of the present disclosure, it is proposed a collective perception message in an Intelligent Transport System comprising an element describing a space representing a specific area of the road topology.

According to another aspect of the present disclosure, it is proposed a device of communication in an Intelligent Transport System, ITS, comprising a processor configured for:

reporting in a collective perception message an element describing a space and comprising a field indicating the space state.

According to another aspect of the present disclosure, it is proposed a device of generation of collective perception message in an Intelligent Transport System comprising a processor configured for:

determining a space determining a state of the space;

generating a space container describing the space and comprising a field indicating the space state; and embedding the space container in the collective perception message.

According to another aspect of the present disclosure, it is proposed a device of reception of collective perception message in an Intelligent Transport System comprising a processor configured for:

receiving the collective perception message;

obtaining an element describing a space and comprising a field indicating the space state;

determining a global perception of the road situation from information comprised in the element.

According to another aspect of the present disclosure, it is proposed a computer-readable storage medium storing instructions of a computer program for implementing a method according to the invention.

According to another aspect of the present disclosure, it is proposed a computer program which upon execution causes the method of the present disclosure to be performed.

At least parts of the methods according to the present disclosure may be computer implemented. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present disclosure may take the form of a computer program product embodied in any tangible medium of expression having computer usable program code embodied in the medium.

Since the present disclosure can be implemented in software, the present disclosure can be embodied as computer readable code for provision to a programmable apparatus on any suitable carrier medium. A tangible carrier medium may comprise a storage medium such as a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present disclosure will become apparent to those skilled in the art upon examination of the drawings and detailed description. Embodiments of the present disclosure will now be described, by way of example only, and with reference to the following drawings, in which.

DETAILED DESCRIPTION OF THE DISCLOSURE

The names of the lists and elements (such as data elements) provided in the following description are only illustrative. Embodiments are not limited thereto and other names could be used.

The embodiments of the present disclosure are intended to be implemented in an Intelligent Transportation Systems (ITS).

The present disclosure proposes a single CPM, i.e. a collective perception message reporting a road state of a monitored road area according to road topology either defined as a MAPEM data or as a regional map data information or locally according to WGS84 reference point with a list of layers used to describe the area topology using in particular layers permitting to identify for examples roadway section, Parking area or shared lane and the corresponding topography as specified in standard ISO 19091.

The originating ITS station, ITS-S, sending such CPM can quickly build it because containers describing the objects it perceives are usually already built in memory, in a so-called Local Dynamic Map or Environment Model.

On the other side, the receiving ITS-S concerned by the CPM containing space containers (e.g. to get global and detailed perception of the road situation) can obtain additional (compared to known technics) information from the single CPM combining multiple objects and transmitted more rapidly than CAMs or CPMs. It can then perform a quicker analysis of the situation with global and detailed perception.

Advantageously, each space containers can be analyzed independently from other space containers content as there positioning is absolute and/or aligned on road topology (for example by referring to WGS84 North or to MAPEM object). It permits to the receiving ITS-S S concerned by the CPM containing space containers to obtain a perception of the road situation even if not all relevant space containers are received. This property is particularly applicable to the space containers used to report for detailed perception (using sub-space as described in the present disclosure).

Figure 1:
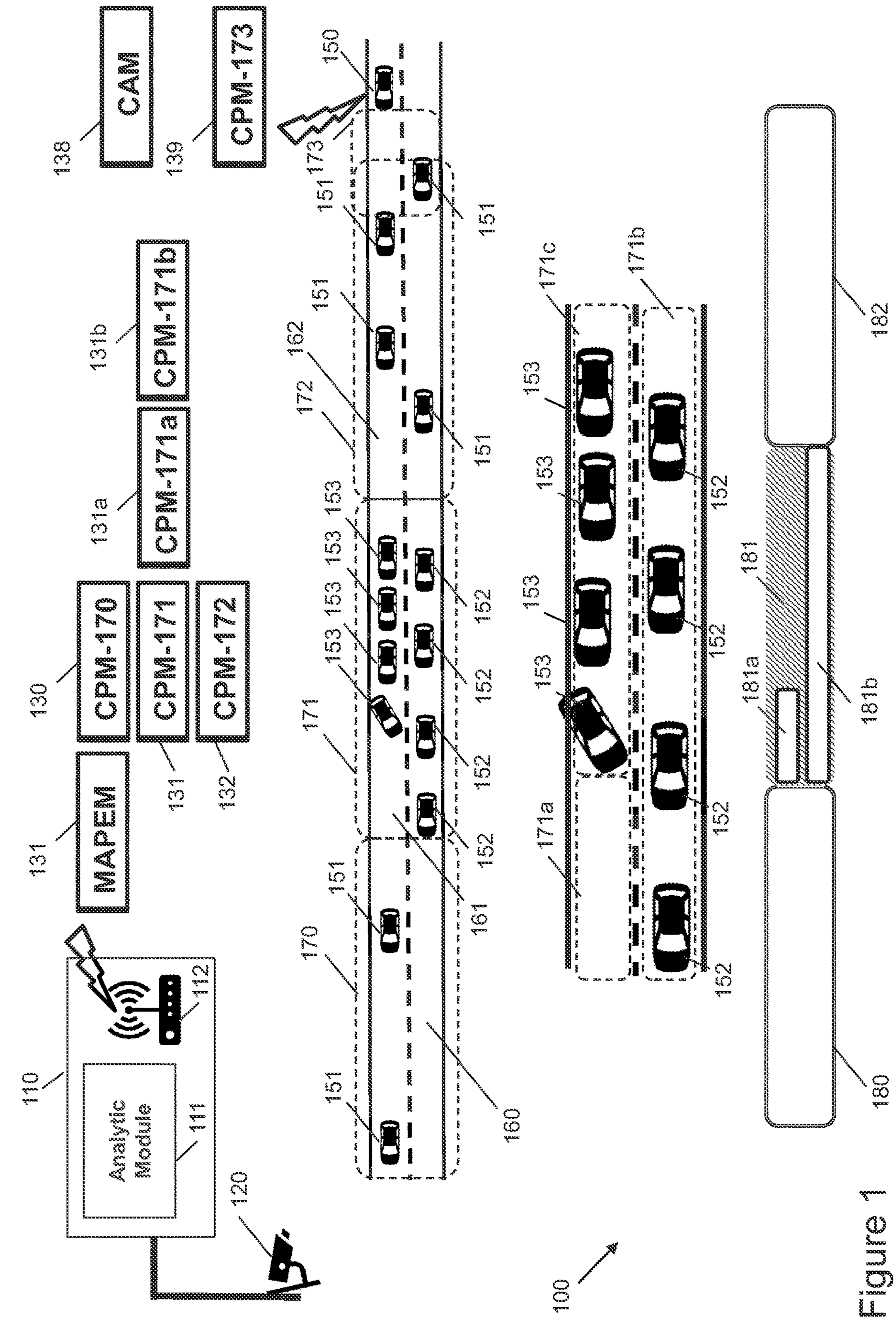
FIG. 1 illustrates a typical Intelligent Transportation Systems (ITS) in which the present disclosure may be implemented.

An example of an ITS system 100 for implementation of embodiments of the present disclosure is illustrated in FIG. 1.

In this example, the originating ITS station, ITS-S, sending the CPM is a road-side unit, RSU. RSUs have advantageously more powerful resources to monitor a road segment situation than moving vehicles: for example, it may have a wider field of view, multiple fields of view, fast access to other information such as traffic conditions, traffic light status, knowledge of objects that populate the monitored area, etc.

In particular, a better view of the monitored area allows an RSU to determine vehicle occupancy in road space according to the road topology with a better confidence as it's static ITS-S station positioned at a relevant traffic observation point. Nevertheless, the originating station may be any ITS station with a space area in its field of view.

ITS 100 is implemented in order to monitor a road segment, and comprises a fixed road side unit 110, and several entities, such that all these entities may carry or comprise ITS station (ITS-S) each, for transmitting and/or receiving ITS messages within ITS 100. The several entities may be for example vehicles 151,152,153, and 150. The vehicles 150,151 and 152 are moving while the vehicles 153 are stopped for any reason resulting in a jam traffic on the lane 161. The lane 161 is considered not normally operating while lanes 160 and 162 are normally operating. The vehicle 150 transmits periodically it parameters using CAM 138 and contributes to the collection perception by transmitting CPM 139.

Fixed road side unit 110 includes a set of sensors, such as image sensors here video camera 120, an analytical module to analyze data provided by the sensors, such as a Situation Analysis module 111. Video camera 120 is configured to monitor or scan a monitored area, here the road topology, and thus reproduced images of the monitored area. In real situations, the camera 120 is likely composed of a set of cameras possibly complemented by different kinds of sensors.

The sensors and the analytical module, i.e. video camera 120 and Situation Analysis module 111, are connected so that the Situation Analysis module 111 processes the stream captured by the sensors/video camera. According to some embodiment, the analytical module and the sensors may be separate from or embedded within the same physical road side unit 110. For example, the analytical module may be wire-connected to the sensors that may be remote (i.e. not embedded in road side unit 110).

The processing by the analytical module, e.g. Situation Analysis module 111, aims at detecting objects potentially present in the monitored area, referred to as "perceived objects" or "detected objects" hereinafter. Mechanisms to detect such objects are well-known by one skilled in the art.

The analytical module, e.g. Situation Analysis module 111, is also configured to output a list of the perceived objects respectively associated with corresponding description information referred to as "state vector". The state vector for a perceived object may include for instance parameters such as position, kinematic, temporal, behavioural or object type classification information, etc.

Therefore, the analytical module may also identify, among the perceived objects, different kinds of objects such as pedestrians, cyclists for example. It may also identify objects such as trees, road construction/work equipment (road barrier, . . . ), and so on.

For example, in the illustrated example, by scanning the monitored area, the Situation Analysis module 111 may perceive the following objects 150, 151,152 and 153 corresponding to vehicles on the roadway.

Further, the perceived objects may be classified, for example, according to whether the ITS station is a vehicle, a pedestrian, or a road side unit, or of another type. Such object type classification may be based for example on predetermined rules, provided during the setting up of road side unit 110, or more generally the ITS-S. ETSI TR 103 562 V2.1.1 defines for instance the categories "unknown", "vehicle", "person", "animal" and "other". Of course, other categories, more specific, can be defined.

The analytic module has some analysis function to analyze the monitored area of the perceived objects and is able to determine objects occupancy on various spaces. In FIG. 1, road segments 160, 161 and 162 are monitored as spaces 170, 171 and 172.

The geometry of spaces is equal to the area defined in the map data of the monitored road. The map data are locally stored in storage 250 on FIG. 2 and/or broadcasted using MAPEM messages. The analytic module is able to determine a space state (SpaceState) for a monitored space.

The space state value may be determined according to the road rule (named road type). The road type is available as map data either received by MAPEM of locally stored in storage 250. In FIG. 1, the road type is a lane.

For a lane,

The value '0' indicates the state "normal" meaning that vehicles move over the lane normally or the space is able to carry some vehicles without issue, the space is operating normally.

The value '1' indicates the state "abnormal" meaning that the space is not operating normally because the lane cannot carry some vehicles or some vehicles are stopped on it.

Any other value is considered as an abnormal state value.

In some embodiments, the analytic module may also be able to split those spaces in sub-spaces in order to obtain different space state values for the sub-spaces. For example, a space geometry is defined by a list of nodes forming a closed area. A node ('nodeXY') is composed of relative coordinates defined in map data stored in storage 250. The analytic module is able to create at least two sub-spaces by adding two nodes forming a segment cutting a space. It results in closed list of nodes describing sub-spaces. The analytic module performs a split when a space state value is not the default value ('0') and a sub-space having a space state with different value than can be determined.

In FIG. 1, The analysis module 111 determines:

state of the space 170 is normal.

state of the space 171 is abnormal.

state of the space 172 is normal.

The analysis module 111 splits the space 171 and obtains the space 171*a* with state value normal, the space 171*c* with state value abnormal and the space 171*b* with state value normal. Finally, the road side unit 110, transmits the collective perception messages resulting from the analysis module 111. The CPMs contain a space container with, for example, the following information:

- SpaceID, an identifier of the monitored space
- SpaceState, the value of the space state as determined by the analysis module 111.
- SpaceParentID, the identifier of the parent space in case of sub-space.
- SpaceOccupancy, number of objects detected by the analysis module 111 in the monitored space.
- SpaceType, the road type as defined in the road topology information in the storage 250.
- SpaceArea, the geometry of the space composed of a list of nodes and geographic reference point (for example e.g. WGS84 North) as defined in the standard ISO19061. This information corresponds to an absolute location information.

The reporting of states to be included in Space Addendum containers, for example, in CPM message(s) to be transmitted by the RSU may contain the following information:

| SpaceID | 170 | 171 | 172 |
|---|---|---|---|
| SpaceState | Normal | abnormal | Normal |
| SpaceOccupancy | 2 | 8 | 4 |
| SpaceType | Lane | Lane | Lane |
| SpaceArea | Road topography of lane 160 | Road topography of lane 161 | Road topography of lane 162 |

Additionally, the analytic module 111 determines 3 sub-spaces 171*a*, 171*b* and 171*c* having different state values and geometry. It is to be noted that the actual SpaceID is an integer identifier, not the string "171*a*" used as a reference on the figure.

The new sub-spaces information to be reported would be like this:

| SpaceID | 171a | 171b | 171c |
|---|---|---|---|
| SpaceParentID | 171 | 171 | 171 |
| SpaceState | normal | normal | abnormal |
| SpaceOccupancy | 0 | 4 | 4 |
| SpaceType | Lane | Lane | Lane |
| SpaceArea | space geometry of spaces 171a | space geometry of spaces 171b | space geometry of spaces 171c |

The state of sub-space 171*c* is equals to the state value of its parent space 171. In this case, it's not necessary to transmit a CPM to report on sub-space 171*c*. it permits to reduce the number of Space Addendum Containers to be transmitted over CPM messages and therefore the size of the message. Alternatively, the CPM containing space 171*c* can be transmitted to get redundancy to overcome the loss of the CPM containing the parent space 171.

The vehicle 150 with ITS-S on board is also reporting using CPM 139 the state of the road lane 162 using it own sensors.

The CPM 139 reports on the sub-space 173 with the following information set:

SpaceID=173

SpaceState='normal'

SpaceOccupancy=1

SpaceType='lane'.

SpaceArea=space geometry of spaces in front of vehicle 151.

The vehicle 150 with ITS-S on board is able to determine globally and quickly the traffic situation in the upcoming seconds by receiving the messages MAPEM 131, CPM 130, CPM 131 and CPM 132. Based on those messages, the driver of vehicle 150 is able to easily get a global perception of the road situation as illustrated by the forms 180, 181 and 182 representing the traffic conditions of the upcoming lanes on the vehicle road trip. Particularly, based on forms 180 and 182, the driver understands that the traffic is normal on lanes 160 and 162. The driver understands a traffic issue on lane 161 without details. It permits to get a first level of details corresponding to a global perception of the situation.

By receiving the messages CPM 131*a* and CPM 131*b*, the driver understands in details the traffic jam situation on lane 161. It permits to get a second level of details corresponding to a detailed perception of the situation. CPM messages having Space Addendum Container 130, 131, 132, are also named G-PCM meaning Global Collective Perception Message according to FIG. 6. CPM messages having Space Addendum Container 131*a* and 131*b* are also named D-PCM meaning Detailed Collective Perception Message according to FIG. 6.

Figure 2:
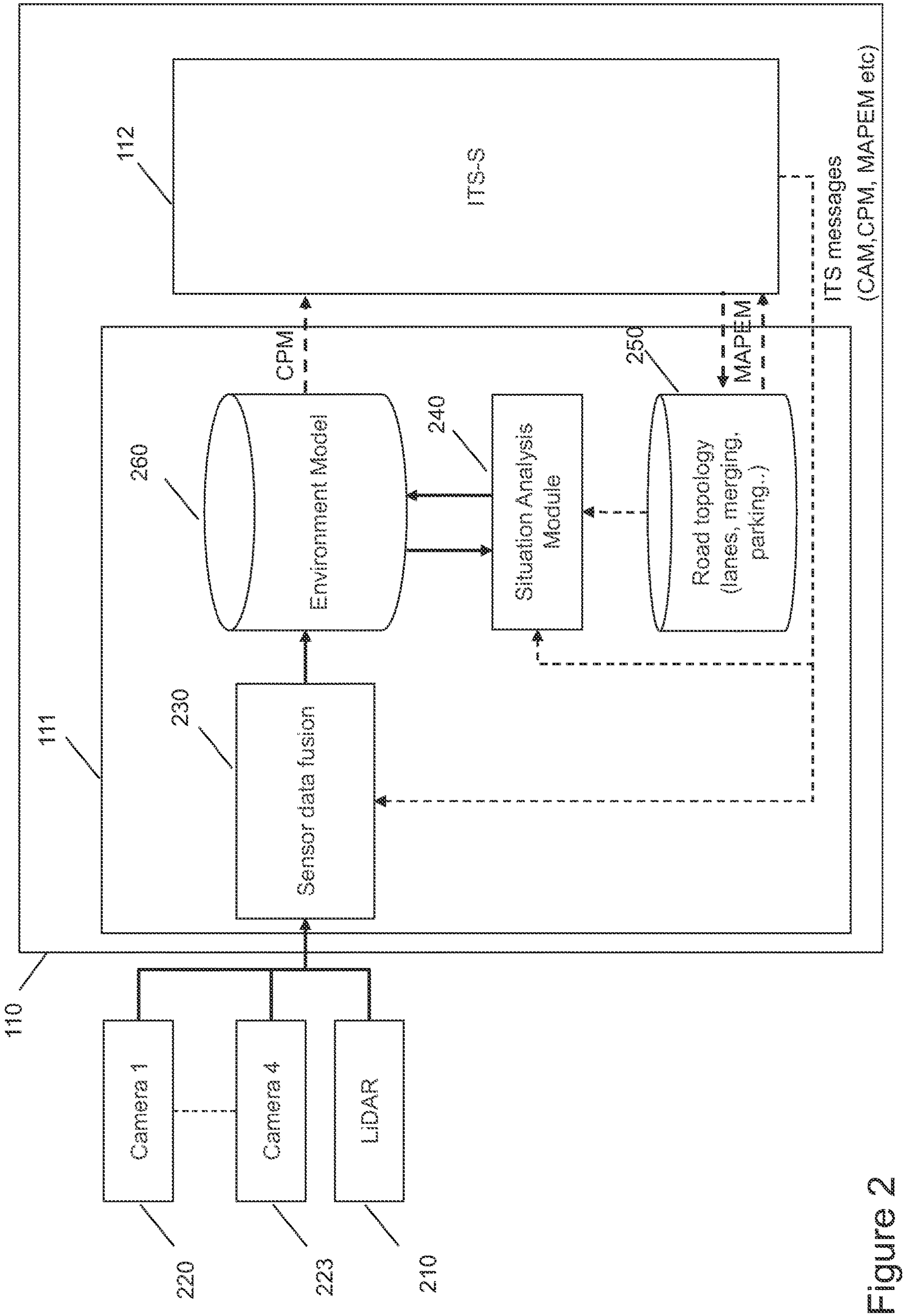
FIG. 2 illustrates a typical ITS station in which the present disclosure may be implemented.

FIG. 2 illustrates a typical ITS station in which the present disclosure may be implemented.

For the purpose of illustration, it is considered here RSU 110, any other type of ITS-S-equipped entity may be used.

As mentioned above, situation analytic module 111 is connected to one or more sensors monitoring the road intersection for example. These may include cameras 220-223 but also other sensors such as, for example, LIDARs (laser imaging detection and ranging devices) 210 or radars.

The perceived objects detected by each sensor are analyzed by a Sensor data fusion module 230 in order to fuse or merge the same objects detected by several sensors. Consideration of similarity between objects from different sensors can be based on their object types, positions, kinetics/dynamics (speed, acceleration), trajectories, etc. A level of confidence may also be computed when scrutinizing the similarities of these information items and the fusion can be performed when the level of confidence is high enough.

Newly perceived objects or updates about already-tracked objects are used to update an environment model 260 of the ITS-S. CAMs and CPMs, conveying additional information, can also be used to update environment model 260.

The environment model is also known as the Local Dynamic Map and contains a list of the perceived objects. Each ITS-S has its own environment model 260.

An object in the environment model 260 is described by multiple information items including all or part of:

objectID: an identifier of the detected object,

SensorID (optional): a list of sensors that have perceived the object, timeOfMeasurement: a time when the (last) measurement was made, stationID (optional): an ITS-S identifier associated with the perceived object, with a corresponding level of confidence. The confidence level can be computed based on the accuracy of a position contained in a received CAM (comprising an ITS ID) and the position measured by the local sensors. In a variant, it is computed based on the number of perceived objects versus the number of transmitting ITS-Ss for a zone, objectRef Point (optional): a reference point corresponding to a reference point of the detected object. By default, the reference point is the centre point of the detected object, Distance: a distance determined according to a frame of reference fixed to the originating ITS-S, here RSU 110. For example, the distance is determined relatively to three directions x, y, z of the frame of reference, such that the distance is indicated within three fields xDistance, yDistance, zDistance, which represent together the distance between the perceived object and the originating ITS station's reference point at the time of measurement, with a corresponding level of confidence, Speed: a speed with respect to originating ITS station's reference point at the time of measurement. For example, the speed is determined relatively to three directions x, y, z of the frame of reference such that the speed is indicated within three fields xSpeed, ySpeed, zSpeed, representing together the speed of the detected object, with a corresponding level of confidence, Acceleration (optional): an acceleration with respect to originating ITS station's reference point at the time of measurement. For example, similarly to the speed, the acceleration is indicated within three fields xAcceleration, yAcceleration, zAcceleration relatively to the three directions of the frame of reference fixed to the originating ITS-S, with a corresponding level of confidence, dynamicStatus (optional): a dynamic Status providing the capabilities of the originating ITS-S to move away from the perceived object, planarObjectDimension (optional): a dimension indicating the dimensions of the perceived object. The dimension may be indicated within three fields planarObjectDimension1, planarObjectDimension2, verticalObjectDimension, and Classification (optional): a classification providing the classification of the perceived object, with a corresponding level of confidence.

For example, a CPM sent by an originating ITS-S wishing to share perceived object information includes containers (Perceived Object Containers), each listing such information for the corresponding perceived object.

The analytic module 111 has some analysis function to determine objects occupancy on those various road areas associated with spaces.

Situation analysis module 240 continuously tracks the objects contained in its environment model 260. This is to determine objects presence in road areas as associated with spaces.

The geometry of a space is equal to the corresponding area defined in the map data of the monitored road. The map data are locally stored in a storage 250 and/or broadcasted using MAPEM messages. The analytic module determines a space state (SpaceState) for a monitored space according to the road type.

The space state value is determined according to the road rule according to the road type, which is reported as SpaceType. The road type may also be obtained from the map data either received by MAPEM and/or locally stored in the storage 250.

In general, or if the SpaceType is not specified, a space state value can be "empty" meaning that there are no object detected in the space (equal to '0') or "not empty" meaning that at least one object has been detected in the space (equal to '1'). The default value is empty.

In another embodiment, the space state value can also have some variations according to the space type.

In a first embodiment, as illustrated in FIG. 1 with a SpaceType is equal to 'lane'. The rule of a lane is to carrier some vehicles. Accordingly, a lane state is normal when the vehicles can move over this lane otherwise if one or more vehicle are stopped or are moving slowly for any reason, the lane state is abnormal. The following space state values may be used:

- the value '0' indicates the state normal meaning that the space is operating normally, it means that the vehicles are moving over this space without issue
- the value '1' indicates the state abnormal meaning that the space is not operating normally, one or more vehicles are stopped in this space.
- Any other value indicates that the space state is abnormal. Optionally, different values can be used to deliver a cause of the operating issue (accident, traffic jam, closed . . . )

Figure 8:
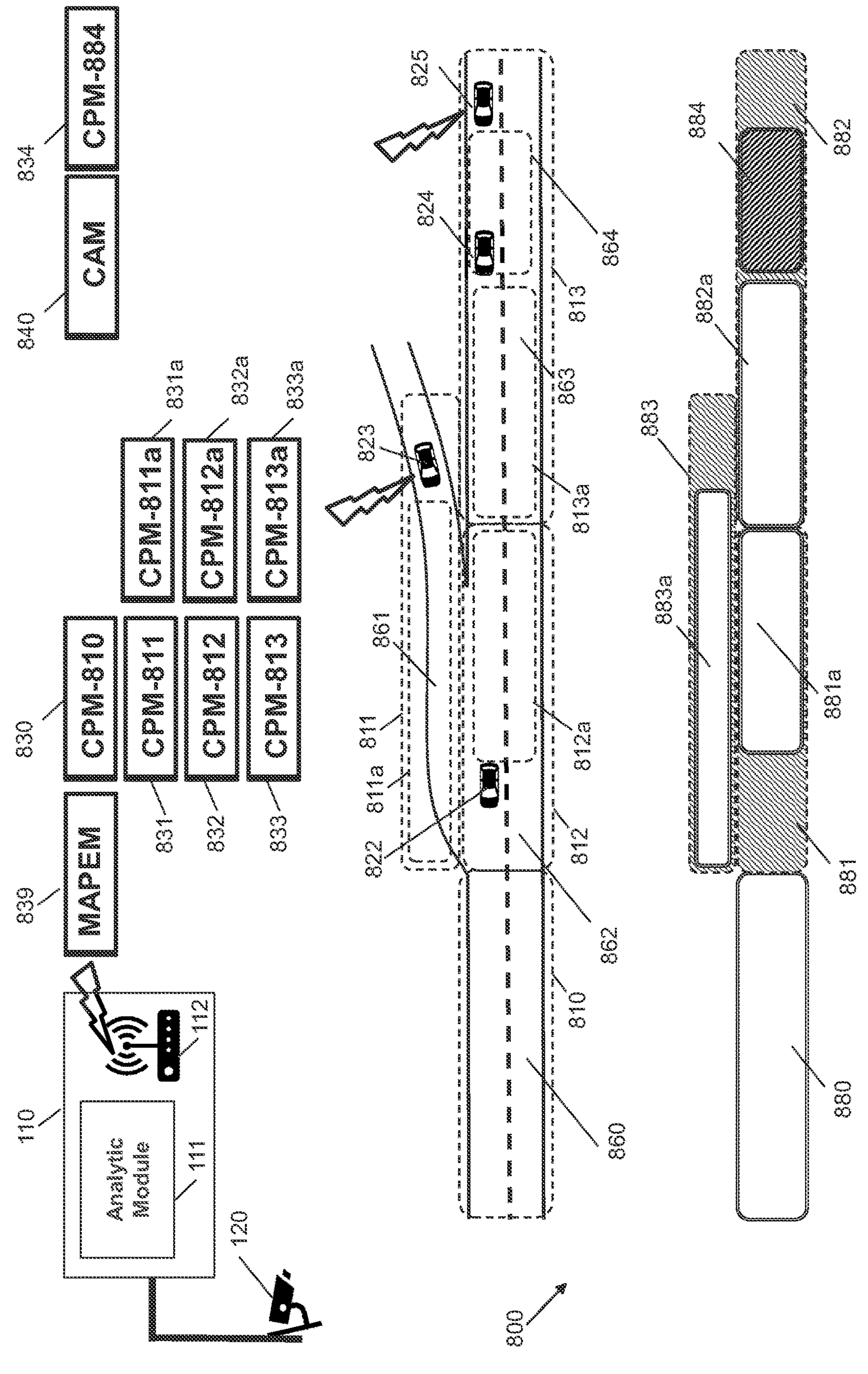
FIG. 8 illustrates an alternative scenario for an implementation of an embodiment of the present disclosure, where the originating ITS-Ss are a road side unit and a vehicle observing an entrance of a motorway having a merging lane.

In a second embodiment as illustrated in FIG. 8 within a SpaceType equal to 'merge lane', the following space state values can be used:

- The value '0' indicates the state free meaning that the space is ready for merging because this space is free from any car.
- The value '1' indicates the state busy meaning that the space is not free and it's not available for merge operation.

Figure 9:
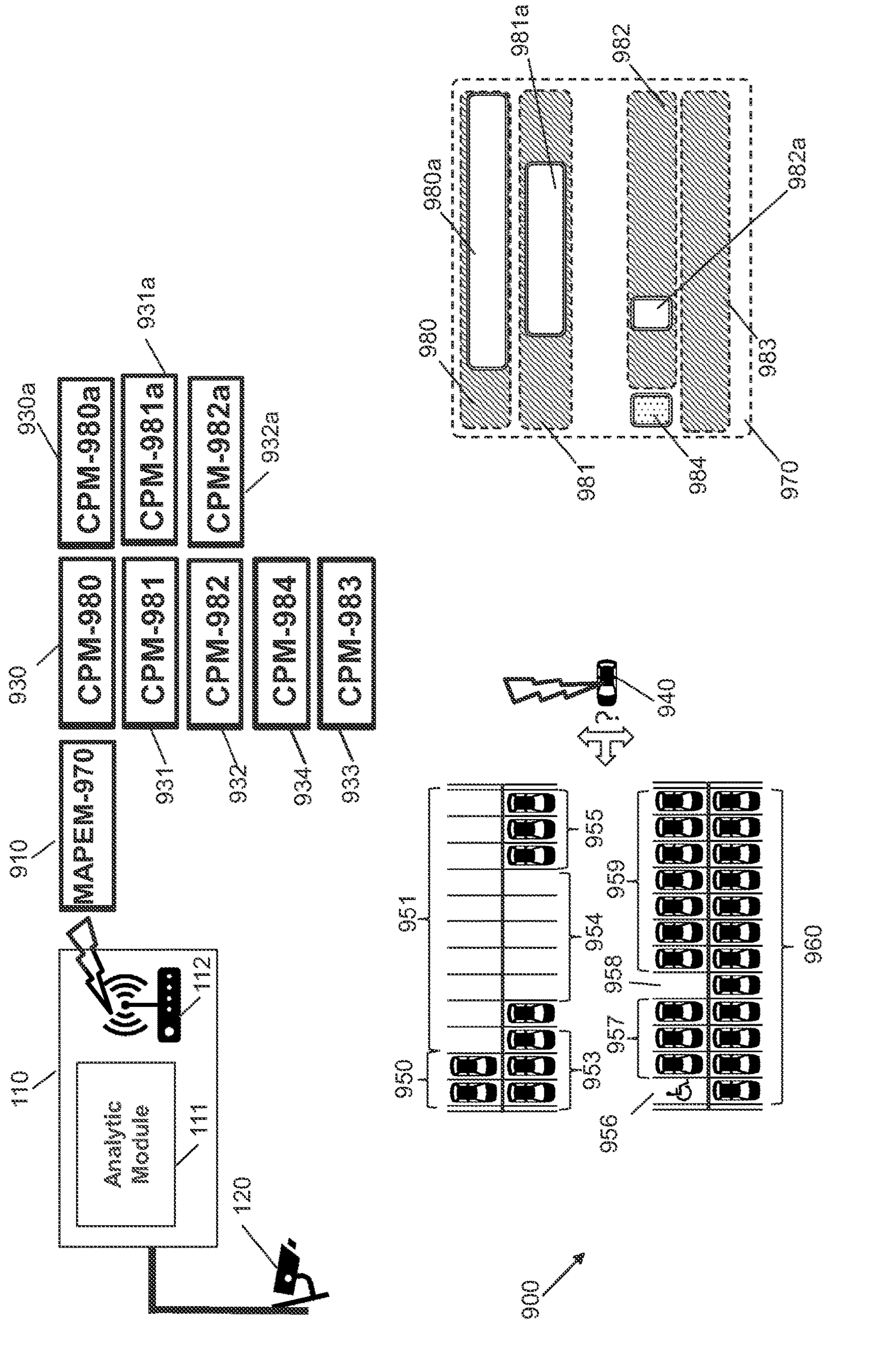
FIG. 9 illustrates another alternative scenario for an implementation of an embodiment of the present disclosure, where the originating ITS-S is a road side unit observing a parking area having free and busy places.

In a third embodiment as illustrated in FIG. 9 within a SpaceType equal to 'parking', the following space state values can be used:

- The value '0' indicates the state free meaning that the space is free for parking a car.
- The value '1' indicates the state busy meaning here that the space is busy and not available for parking a car.

Figure 14:
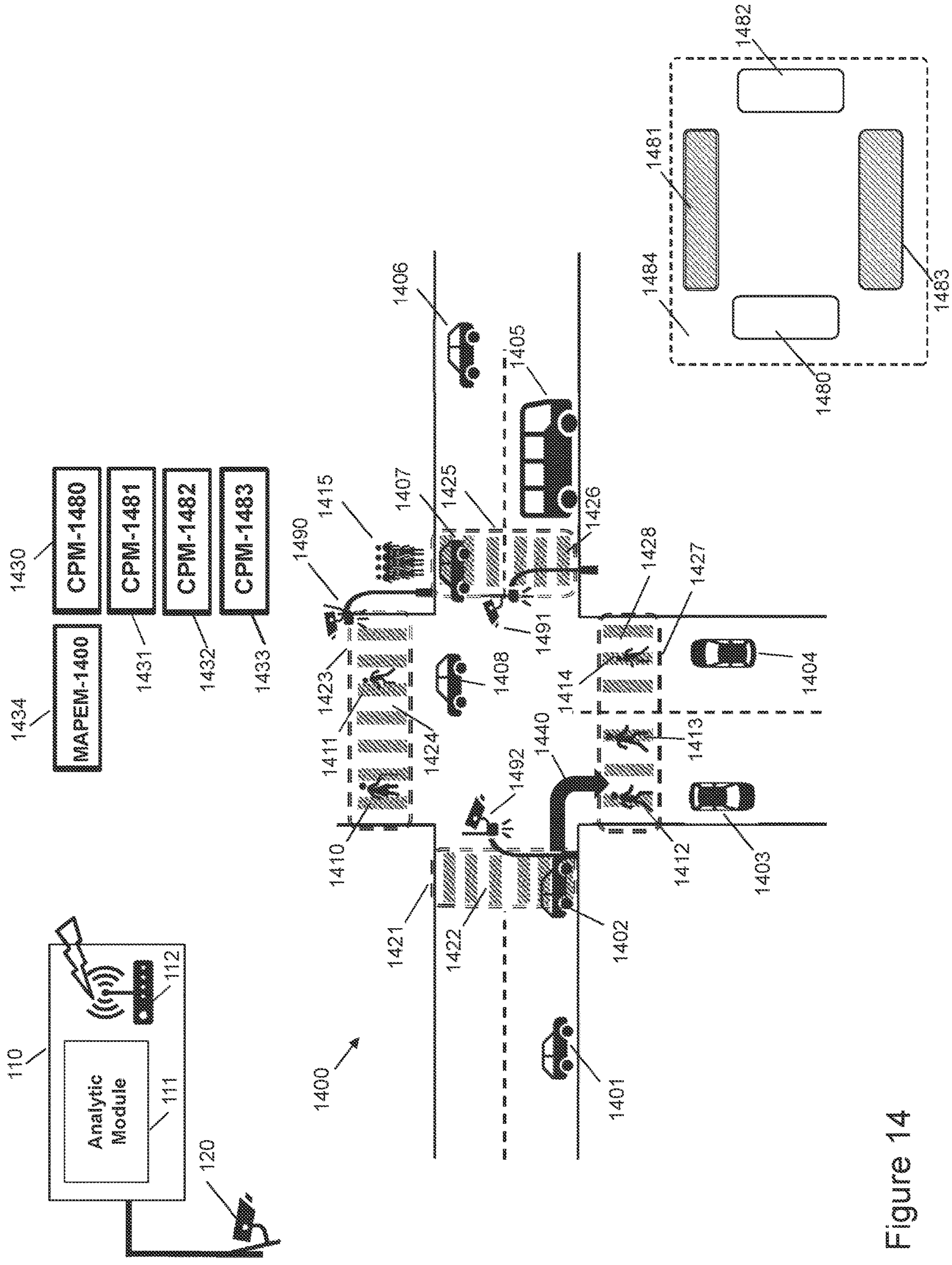
FIG. 14 illustrates another alternative scenario for an implementation of an embodiment of the present disclosure, where the originating ITS-S is a road side unit observing an intersection area having pedestrian crosswalks.

In a fourth embodiment as illustrated in FIG. 14 within a SpaceType equal to 'pedestrian cross walk', the following space state values can be used:

- The value '0' indicates the state free meaning that no pedestrian are present in the space.
- The value '1' indicates the state busy meaning that there are pedestrian in the space.

In some embodiments, the analytic module can also split those spaces in sub-spaces in order to obtain different space state values for the sub-spaces. For example, a space geometry is defined by a list of nodes forming a closed area. A node ('nodeXY') is composed of relative coordinates defined in map data stored in storage 250. The analytic module is able to create at least two sub-spaces by adding two nodes forming a segment cutting a space. It results in closed list of nodes describing sub-spaces. The analytic module performs a split when, at least, two sub-spaces can be obtained having two different space state values.

Figure 4:
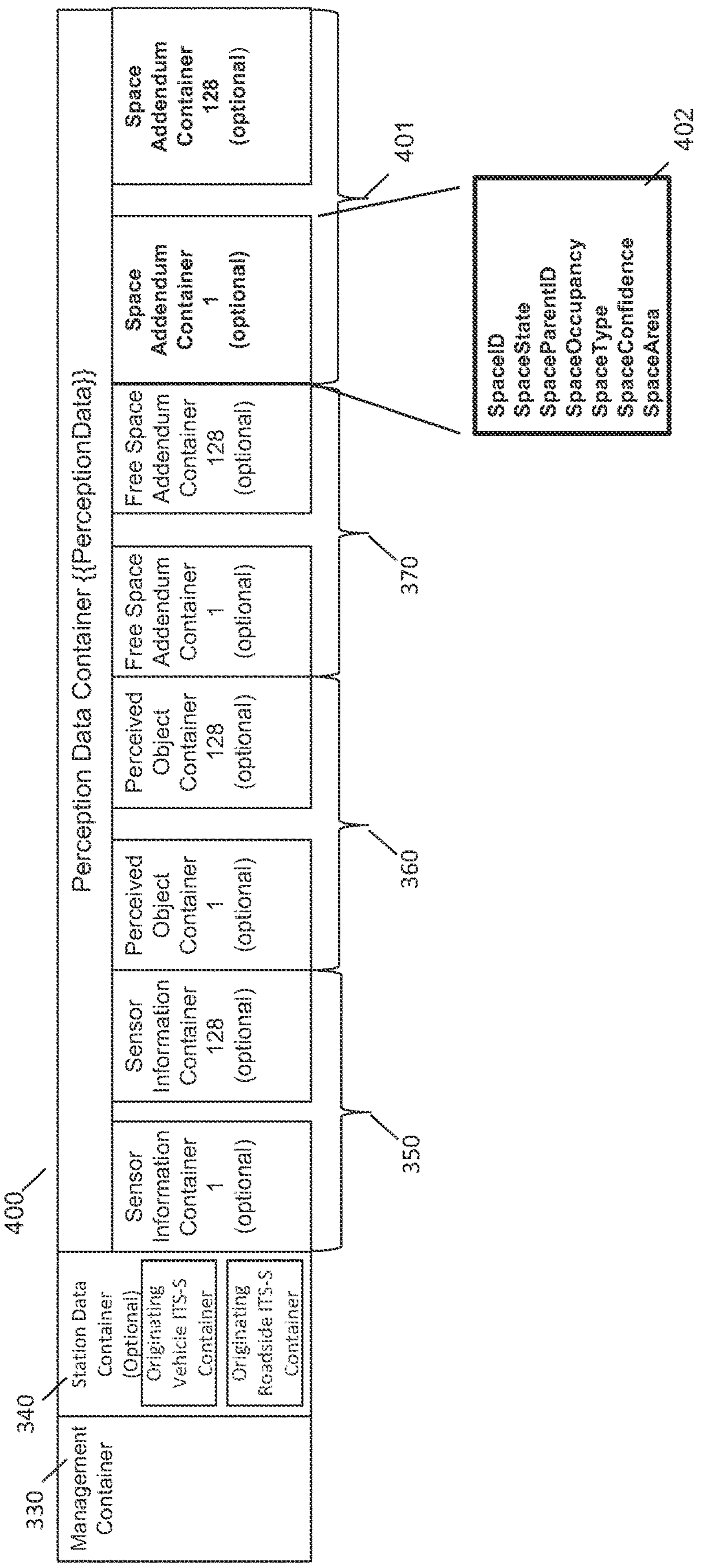
FIG. 4 illustrates an exemplary format of a CPM according to embodiments of the present disclosure.

Based on this space monitoring, Space Addendum Container is created including different fields to be added in CPM message, as illustrated in FIG. 4.

The CPM is conventionally sent by R-ITS-S 112 of RSU 110.

Figure 3:
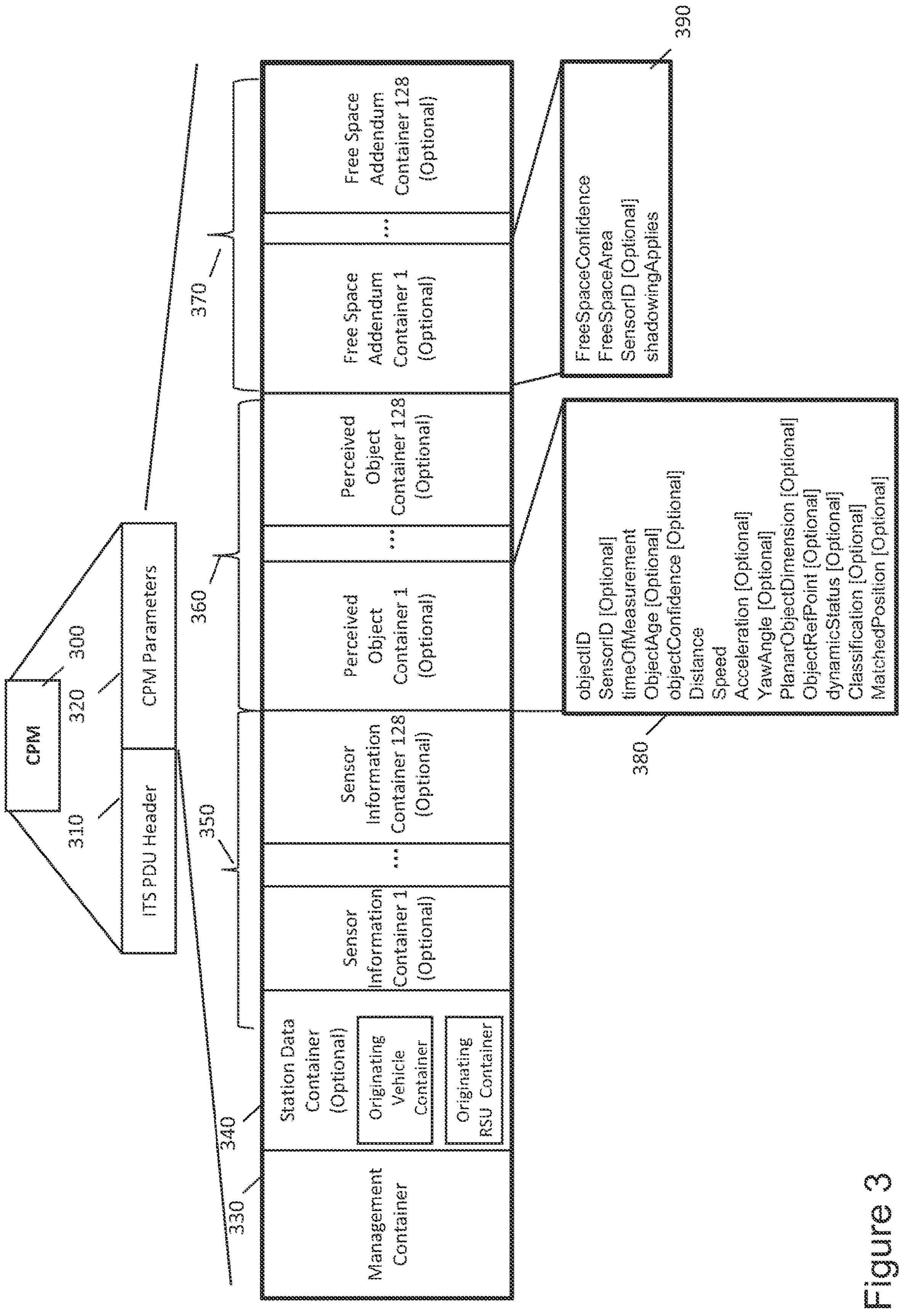
FIG. 3 illustrates an exemplary format of a CPM according to standard specification.

An exemplary format of a CPM 300 according to ETSI TS 103 324 (V0.0.22 of May 2021) is illustrated in FIG. 3.

A CPM 300 contains an ITS PDU header 310 and a "CPM Parameters" field 320.

ITS PDU header 310 is a common header that includes the information of the protocol version, the message type and the ITS-S ID of the originating ITS-S.

"CPM Parameters" field 320 contains a Management Container 330, a Station Data Container 340, a set of Sensor Information containers 350, a set of Perceived Object containers 360 and a set of Free Space Addendum Containers 370.

Regardless of which type of ITS-S generates a CPM, the Management Container provides information regarding the Station Type and the Reference Position of the originating ITS Station. The message can be transmitted either by a ITS Station, such as a vehicle, or by a stationary RSU. In case of a CPM generated by a vehicle, the Station Data Container contains the dynamic information of the originating ITS Station. It is not optional in case of a vehicle transmitting the CPM. In case of a CPM generated by a RSU, the Station Data Container may provide references to identification numbers provided by the MAP Message (CEN ISO/TS 19091) reported by the same RSU. These references are required in order to match data provided by the CPM to the geometry of an intersection or road segment as provided by the MAP message. It is not required that a RSU has to transmit a MAP message for matching objects to road geometries. In this case, the Station Data Container may be omitted. It is for this reason that the Station Data Container is set as optional.

Each Sensor Information container contained in the set of Sensor Information containers 350 is optional. It provides information about the sensory capabilities of an ITS station. Depending on the station type of the originating ITS station, different container specifications are available to encode the properties of a sensor. The Sensor Information Containers are attached at a lower frequency than the other containers, as defined in ETSI TR 103 562. Up to 128 containers of this type may be added.

Each Perceived Object Container contained in the set of Perceived Object containers 360 is optional. It is composed of a sequence of optional or mandatory data elements (DEs) which give a detailed description of the dynamic state and properties of a detected object.

More precisely, each object has to be described using structure 380 by at least an identifier (defined by the DE ObjectID), a time of measurement (defined by the DE timeOfMeasurement) referred to as corresponding to the time difference for the provided measurement information with respect to the generation delta time stated in the management container, a distance (defined by the DEs xDistance and yDistance) and a speed (defined by the DEs xSpeed and ySpeed) in the x/y plane of the respective coordinate system with respect to a station's reference point.

Moreover, several optional DE are available, to provide a more detailed description of a perceived object as acceleration (defined by the DEs xAcceleration and yAcceleration), dynamic Status (defined by the DE dynamicStatus) or classification (defined by the classification DE). Distance, Speed and Acceleration values can also be provided in three dimensions (respectively with the DEs zDistance, zSpeed and zAcceleration) along with the yaw angle of the object (defined by the DE yawAngle). Furthermore, a three-dimensional description of an object's geometric extension can be provided (with the DEs planarObjectDimension1, planarObjectDimension2 and verticalObjectDimension). Moreover, a RSU is also able to provide a map-matching result for a particular object with respect to the MAP information (defined by the DE matched Position).

Each Free Space Addendum Container contained in the set of Free Space Addendum Containers 370 is optional. It is composed of a sequence of optional or mandatory data elements (DEs) which provide information of detected free space performed by a particular sensor. More precisely, each Free Space has to be described using structure 390 by at least a confidence (defined by the DE FreeSpaceConfidence), a space area geometry (defined by the DE FreeSpaceArea), the sensors used to monitor the free space (optional, defined by the DE SensorID) and a flag shadowingApplies indicating that shadowing mechanism applies within the area described by freeSpaceArea. The flag shadowingApplies is a Boolean indicator to indicate if tracing approach should be used to compute a shadowed area behind an object. If set to TRUE, the simple tracing approach should be applied for each object intersecting or located within the area or volume described by the freeSpaceAddendum container. If set to FALSE, the simple tracing approach should not be applied for each object intersecting or located within the area or volume described by the freeSpaceAddenum container.

Collective Perception Messages don't permit to determine the situation globally according to the car driver intention and to help his decision. From car driver point of view, it's more relevant to obtain different level of details of the road situation as it happens with natural perception. At first, a driver looks at getting a global perception of the road situation in order to take a decision and, in second, he looks at getting detailed information only useful to execute his previous decision and to adapt precisely his driving.

An exemplary format of a CPM according to embodiments of the present disclosure is illustrated in FIG. 4. It is based on a CPM format used to report on a space monitoring using Space Addendum Container instead of/or complementary to free space monitoring using Free Space Addendum Container as specified in the version 1.3.1 of the ETSI TS 103 324 (V0.0.22 of May 2021) specification as shown in FIG. 3.

The Perception Data container composed of 350, 360 and 370 is extended in order to integrate Space Addendum Container 401 used by the present disclosure. It results in a new perception Data Container 400.

Each Space Addendum Container contained in the set of Space Addendum Containers 401 is optional. It is composed of a sequence of optional or mandatory data elements (DEs) which provide information of space performed by one or more sensors. More precisely, each space monitored can be reported using structure 402 comprising at least a Space identifier (defined by the DE SpaceID), a space state (defined by the DE SpaceState) and the geometry of the area monitored as a space (defined by the DE SpaceArea). Optionally, Space Addendum Container may also report the space occupancy (defined by the DE SpaceOccupancy). Space Addendum Container may also report the space relationship with another space, considered it's a subpart of this other space, using a parent identifier (defined by the DE SpaceParentID). Space Addendum Container may also report the type of road area monitored as a space (defined by the DE SpaceType). Space Addendum Container may also report the confidence of the determined space state (defined by the DE SpaceConfidence). The confidence value is derived by the computation of the space monitoring confidence based on a sensor's or fusion system's specific detection. The confidence value indicates a level of confidence of the measurement, consisting of determining presence of object over a monitored space from 0 (no confidence) to 100 (highest confidence level).

A detailed description of Space Addendum Container 402 according to some embodiments may be as follow.

SpaceID is an identifier assigned to a monitored space as an object which remains constant as long as the space is perceived by the originating ITS-S. Numbers are assigned in an increasing round-robin fashion. When the last identifier in the allowed range has been used, the first counter for the identifier starts from the beginning of the range again.

SpaceState is a value indicates that the monitored space is either in a default state corresponding to the state empty (equal to 0) or not empty (value equal to or greater than 1). The default value is 0. The possible values can also have some variations according to the SpaceType as derived from road type.

For a SpaceType value equal to 'lane', the following space state values can be used:

The value '0' or normal indicates the space is operating normally, the vehicles are moving over this space.

The value '1' or abnormal indicates the space is not operating normally because some vehicles are stopped or their speed is abnormally slow.

Any other value indicates that the state value is abnormal due to a road cause.

For a SpaceType equal to 'parking', the following space state values can be used:

The value '0' indicates the state free meaning that the space is free for parking a car.

The value '1' or greater indicates the state busy meaning that the space is not available for parking a car.

For a SpaceType equal to 'merge lane', the following space state values can be used:

The value '0' indicates the state free meaning that the space is available for merging operation.

The value '1' or greater indicates the state busy meaning that the space is not available for merging operation.

SpaceParentID is an identifier (same data element as SpaceID) of the parent space if any. This DE is optional. The SpaceParentID value is determined during the algorithm illustrated by FIG. 6 in step 650 for example.

SpaceOccupancy is a value used to report on the occupancy as a global evaluation of the monitored space. The value can be the number of vehicles detected in the monitored space by the analysis module 111. This DE is optional.

SpaceType is a value used to indicate the type of the monitored space. It can be derived from the DE Road attributes. For example, SpaceType value can be a lane, a merged lane, a diverged lane, a parking, a cross walk or any other type of road topology. The possible values can be extended using standard EN ISO TS19091, SAE J2735.

SpaceConfidence is a level of confidence of the measurement from 0 (no confidence) to 100 (highest confidence level). This value is derived by the computation of the space monitoring confidence based on a sensor's or fusion system's specific detection 230 confidence on the analysis module 111.

SpaceArea is a Geographical Area Definition of the monitored space according to ETSI EN 302 931.

Figure 11:
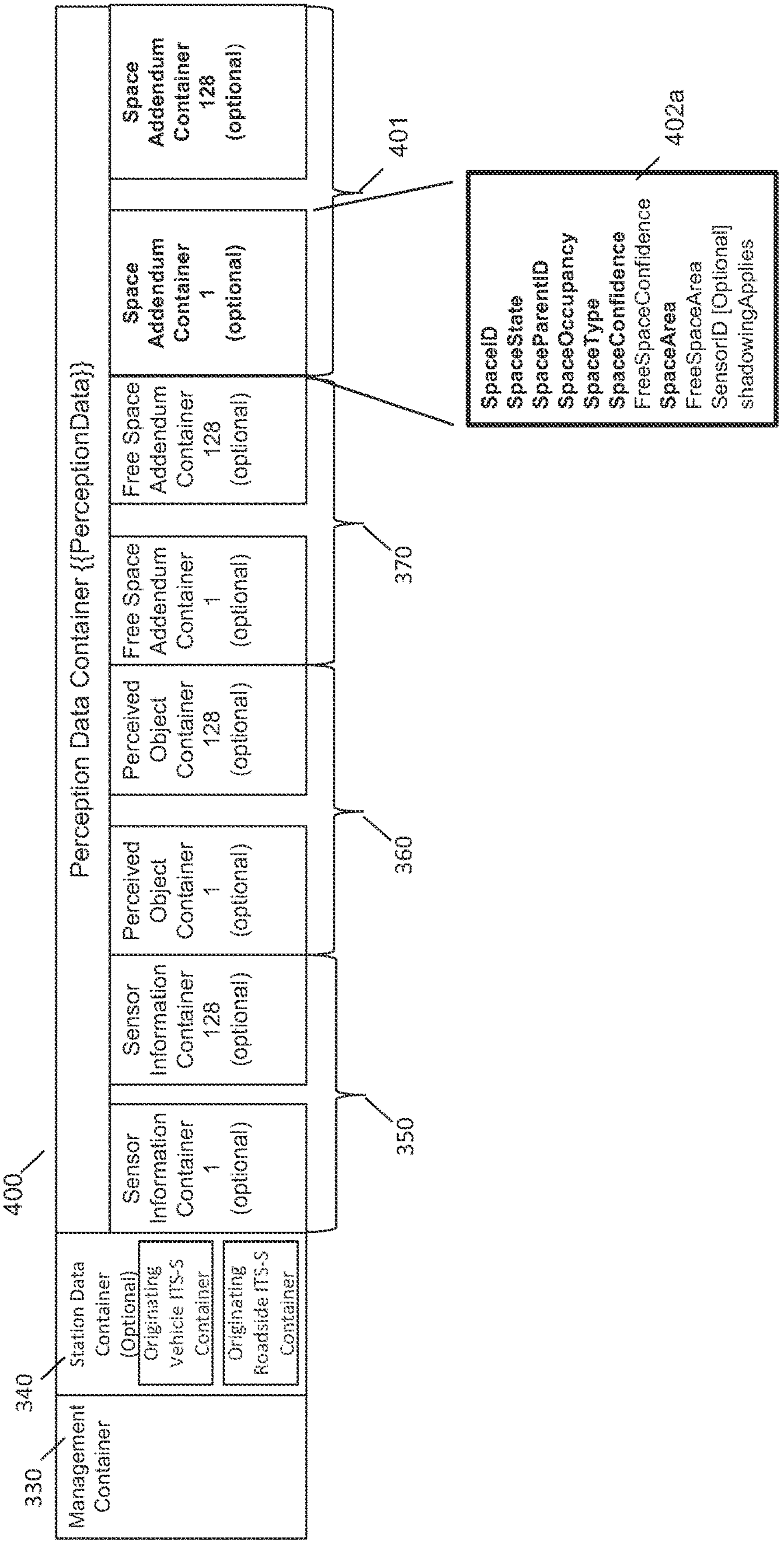
FIG. 11 illustrates a second exemplary format of a CPM according to some embodiments of the present disclosure.
Figure 12:
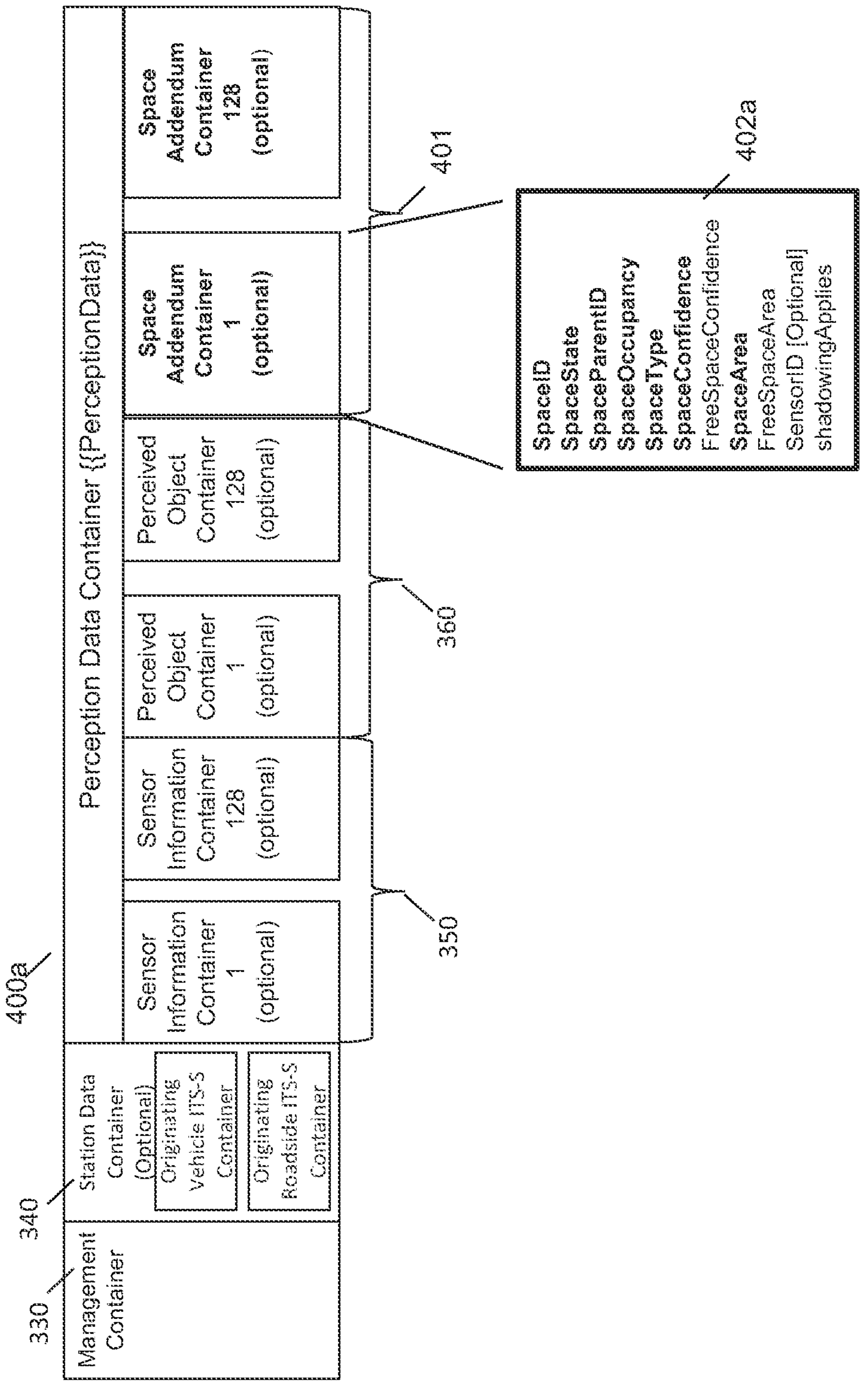
FIG. 12 illustrates a third exemplary format of a CPM according to some embodiments of the present disclosure.

In some embodiments as illustrated in FIG. 11, the space container 402*a* may comprise the existing fields of a free space container. In some embodiments as illustrated in FIG. 12, the CPM 400*a* may only comprise a space container that may represent either a free space or a space associated with a specific road area. FreeSpaceConfidence field and SpaceConfidence field can be represented by the same filed. FreeSpaceArea field and SpaceArea field can be represented by the same filed.

Figure 13:
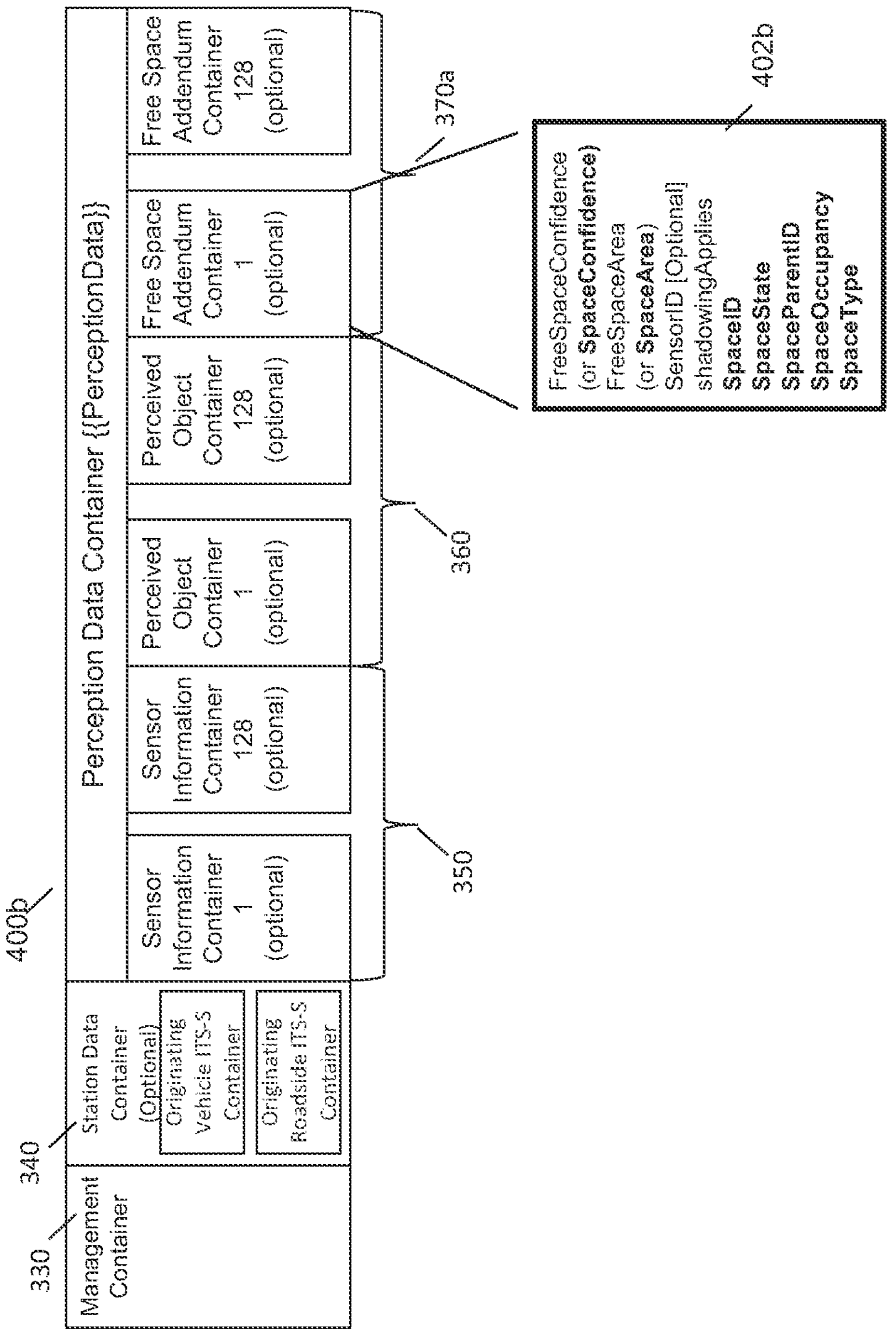
FIG. 13 illustrates a fourth exemplary format of a CPM according to some embodiments of the present disclosure.

In some embodiments as illustrated in FIG. 13, the CPM 400*b* may comprise only free space container 370*a* that may comprise fields 402*b* described above for a space container.

As specified in the standard, the generation of a CPM to be transmitted relies on the generation of a CPM event as specified in section 6.1.3.1 (refer to CP Message generation frequency management of the ETSI TS 103 324 (0.0.22).

In the current version of the standard, a CPM may contain perceived Object Containers 360 and/or Free Space Addendum Containers 370 (in addition to Management container).

More specifically, the current version of the standard includes specific inclusion procedures. Specific inclusion procedures specify the inclusion of the perceived Object Containers in section 6.1.3.2 and the inclusion of the Free Space Addendum Containers in section 6.1.3.4.

The inclusion procedure of the perceived Object Containers comprises a set of specified conditions, referred to as perceived Object Inclusion conditions. In particular, a perceived Object Container comprising updated information relating to a previously perceived object is included in the next CPM to be transmitted if one of the following conditions is met:

- the updated information of the perceived object has first been detected after the last CPM event generation, or
- the Euclidian absolute distance between the lastly reported position and the current updated position of the reference point of the perceived object exceeds a predetermined threshold, minReferencePointPositionChangeThreshold, or
- the elapsed time since the last time the object was reported exceeds a predetermined threshold T_GenCpmMax.

The inclusion procedure of the Free Space Addendum Containers comprises a set of specified conditions, referred to as Free Space Inclusion conditions. In particular, a Free Space Addendum Container comprising updated information relating to a previously perceived free space is included in the next CPM to be transmitted if one of the following conditions is met:

- In cases where the free space area corresponds to a polygon area, a Free Space Addendum Container may be added to the current CPM if the Euclidian relative distance between the vertices of the polygon relative to the corresponding vertices of this polygon lastly included in a CPM exceeds 4 m or if the number of vertices to describe the polygon changes.
- In cases where the free space area corresponds to a circular area, or an elliptical area or a rectangular area, a Free Space Addendum Container may be added to the current CPM if the difference between the current Euclidian distance of the center point of the described free space area and the Euclidian distance of the center point of the same described free space area and lastly included in a CPM exceeds 4 m. Further, a Free Space Addendum Container may be added to the current CPM if the difference between the current radius or length of the described free space area and the Radius or length of the same described free space area lastly included in a CPM exceeds 4 m. Additionally, a Free Space Addendum Container may be added to the current CPM if the difference between the current orientation of the described free space area and the orientation of the same described free space area lastly included in a CPM exceeds 4 degrees.

Considering the present disclosure, the space Container inclusion can comprise a set of conditions referred as Space inclusion conditions. This set of conditions can be derived from FreeSpace container inclusion conditions.

Additionally, a space container may be included in the next CPM to be transmitted if one the following condition is met:

- The space container state is updated compared to the lastly reported CPM, or
- A new sub-space is determined after the last CPM event generation, or
- the updated information of the space has first been detected after the last CPM event generation, or
- the Euclidian absolute distance between the lastly reported position and the current updated position of the reference point of the perceived space exceeds a predetermined threshold, minReferencePointPositionChangeThreshold (as defined for the PerceivedObject container), or
- the elapsed time since the last time the space was reported exceeds a predetermined threshold T_GenCpmMax (as defined for the PerceivedObject container).

The T_GenCpmMax value can be different depending on whether the Space container is reporting a space or a sub-space. It permits to get a different refresh rate between the global perception and the detailed perception. For example, the detailed reception can be reported using a predetermined threshold T_GenCpmMax1 value lower than predetermined threshold T_GenCpmMax1 value used to report for the global perception.

Figure 5:
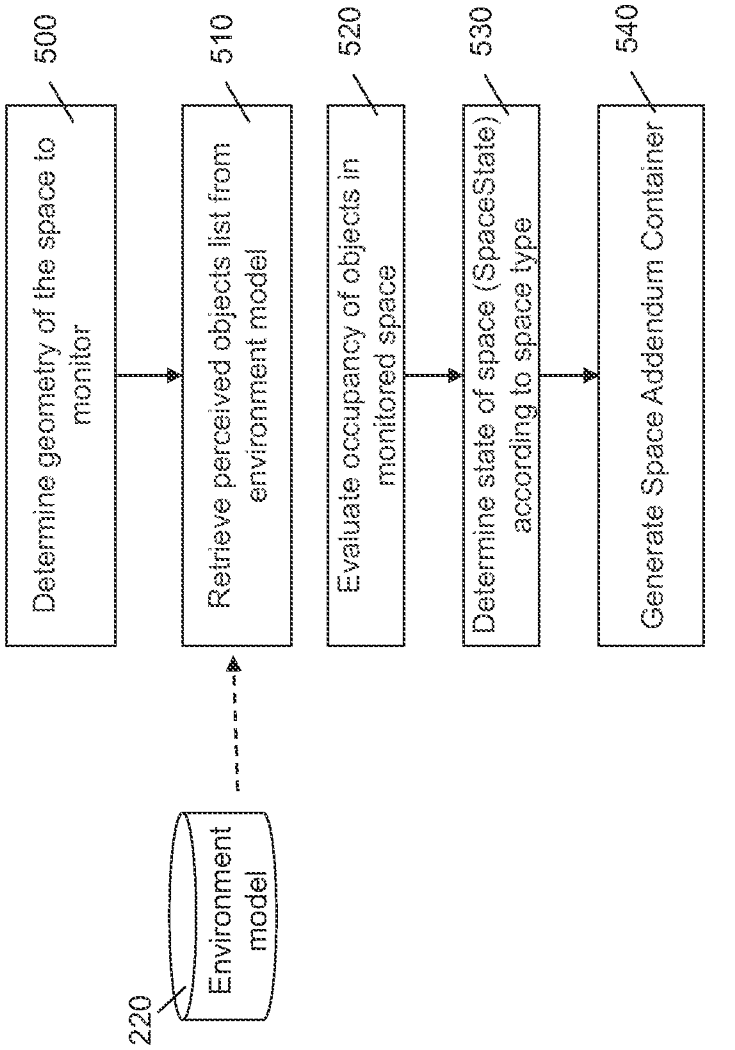
FIG. 5 illustrates, using flowchart, steps of methods to generate a space container to be transmitted over a CPM according to embodiments of the present disclosure.

FIG. 5 illustrates, using flowchart, general steps of a method according to embodiments of the present disclosure at an originating ITS-S to generate a Space Addendum Container as described in FIG. 4.

Situation Analysis Module 240 is configured to monitor periodically some spaces such as a road portion, a road intersection, a merging lane, a diverging lane, a parking as shown in FIG. 1, FIG. 8, FIG. 9 or FIG. 14 and is able to determine its geometry (DE SpaceArea) and its road attribute (DE SpaceType) stored in the road topology module 250. The DE SpaceID is determined for any monitored space.

DE SpaceArea and DE SpaceType can be retrieved from MAPEM or defined by a human as a configuration of situation analysis module 111.

Figure 6:
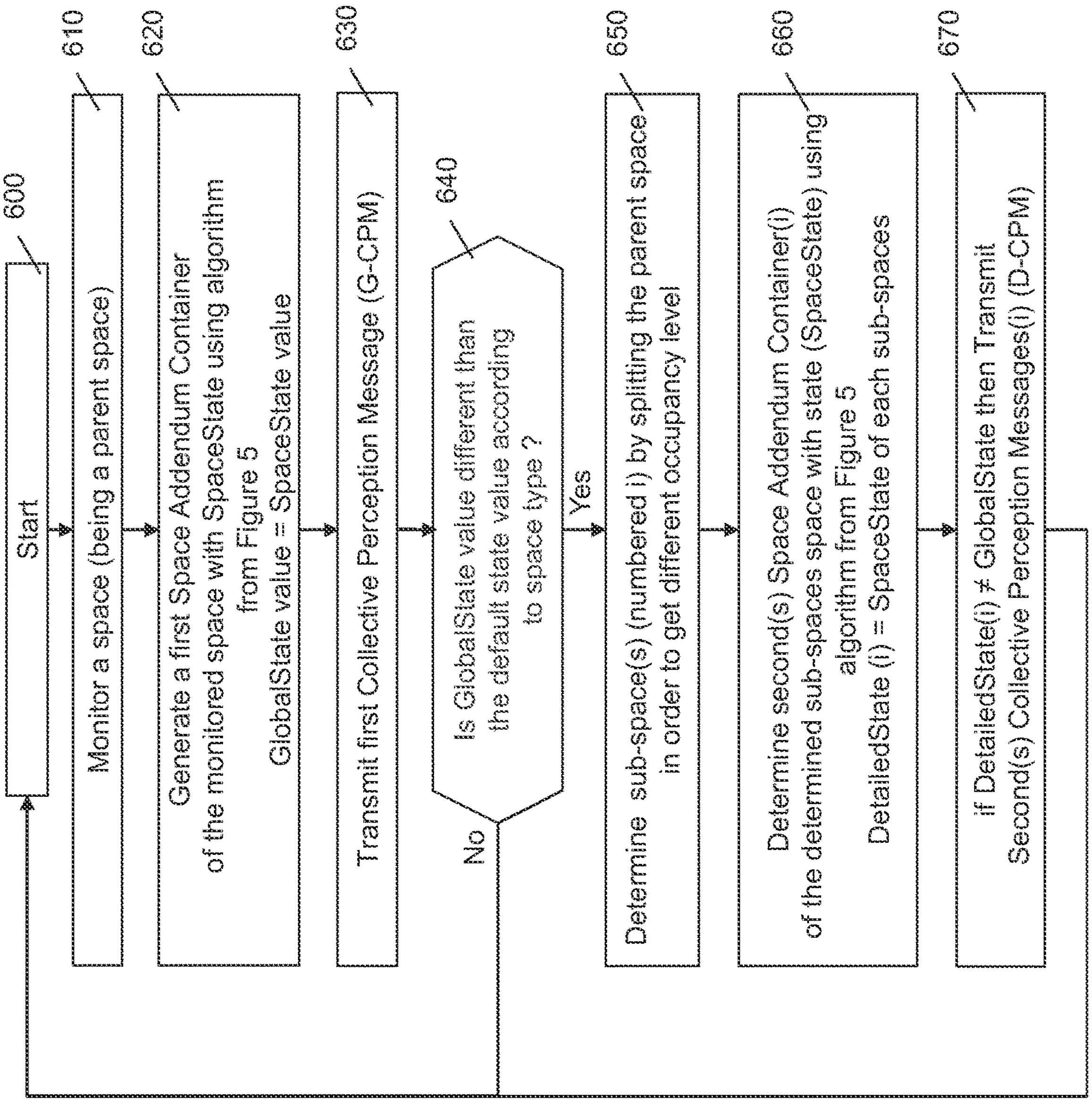
FIG. 6 illustrates, using a flowchart, more detailed steps of the method at the originating ITS-S according to embodiments of the present disclosure.

Alternatively, the determined geometry of the space to monitor can be a sub-space of another space as described in FIG. 6. In this case, the monitored sub-space is consider as a child of the space in which it's included. The including space of this sub-space is a parent of this sub-space. When a sub-space is reported in Space Addendum Container the DE SpaceParentID is equal to the DE SpaceID of parent space.

The originating ITS-S uses its sensors 220-223, 210 and its Sensor Data Fusion module 230 to update its Environment Model 260 with perceived objects.

Situation Analysis Module 240 continuously analyses the objects of the Environment Model 260. It retrieves at step 510 the list of perceived objects. In step 520, the situation analysis module 240 determines the occupancy of the monitored space using the positions of the perceived objects in step 510 and knowing the geometry of the monitored space in step 500. Also, the occupancy can be determined according to the space type. For example, the occupancy of pedestrian cross walk space can be busy only if some perceived objects retrieved are pedestrians and if their positions are part of the monitored space overlapping the cross walk and having a space type equals to a cross walk lane. In step 530, Situation Analysis Module 240 determines the space state (DE SpaceState) value based on the previously determined occupancy as described above. Optionally, the occupancy level (DE SpaceOccupancy) and confidence level (DE SpaceConfidence) are also determined as described in FIG. 4.

Finally, the Space Addendum Container 401 is generated from the previously determined data elements: SpaceID, SpaceState, SpaceParentID, SpaceOccupancy, SpaceType, SpaceConfidence and SpaceArea.

FIG. 6 illustrates, using a flowchart, main steps of the method at the originating ITS-S according to embodiments of the present disclosure.

In step 600, the process starts periodically and by polling the various space to monitor in step 610 according to the present disclosure.

In step 610, A space, being a parent space, is monitored.

In step 620, A first Space Addendum Container is generated from the monitoring of the previous parent space according to FIG. 5 and the corresponding space state (DE SpaceState) is registered as a global space state (named GlobalState).

In step 630, the previously generated first Space Addendum Container is transmitted over a first Collective Perception Message. This transmission permits to deliver to other ITS-S a global perception of road situation as monitored using the previous parent space.

In step 640, the GlobalState value is compared to the default state value defined accordingly to the road type in Table 1.

If the GlobalState value is normal, the process returns in the first step 600.

Alternatively, if the GlobalState value is not the default state value ('0'), therefore abnormal, the process goes in step 650.

In step 650, the parent space is split in sub-spaces in order to obtain different space state values for the sub-spaces than the space state value of the parent state (GlobalState). For example, a space geometry is defined by a list of nodes forming a closed area. A node ('nodeXY') is composed of relative coordinates defined in map data stored in 250. two sub-spaces can be created by adding 2 nodes forming a segment cutting a space based on the determined occupancy in step 520. It results in closed list of nodes describing sub-spaces also named child space in the present disclosure. The previous split is performed in order to get different occupancy levels for each sub-space between its.

In step 660, second(s) Space Addendum Container(s) are generated for each previous child space(s) according to FIG. 5 and the corresponding space state(s) (DE SpaceState) are registered as a detailed space state(i) (named DetailedState (i)). (i) is used to numbered each sub-space.

In step 670, the previously generated second(s) Space Addendum Container(s) are transmitted over one or more second(s) Collective Perception Message(s) only if the respective DetailedState(i) are different than GlobalState. This transmission permits to deliver to other ITS-S a detailed perception of road situation as monitored using the previous sub-spaces. The delivered detailed perception is built in a manner to be complementary to the previously delivered global perception of road situation by transmitting only CPM with Space Addendum Container of sub-space having different SpaceState value than their parent space.

Finally, the process returns in step 600 to analyze the next parent space.

Optionally, in some embodiments, the process of splitting a space into a plurality of sub spaces may be reiterated to get more level of sub spaces. This may be advantageous in complex situations.

Figure 7:
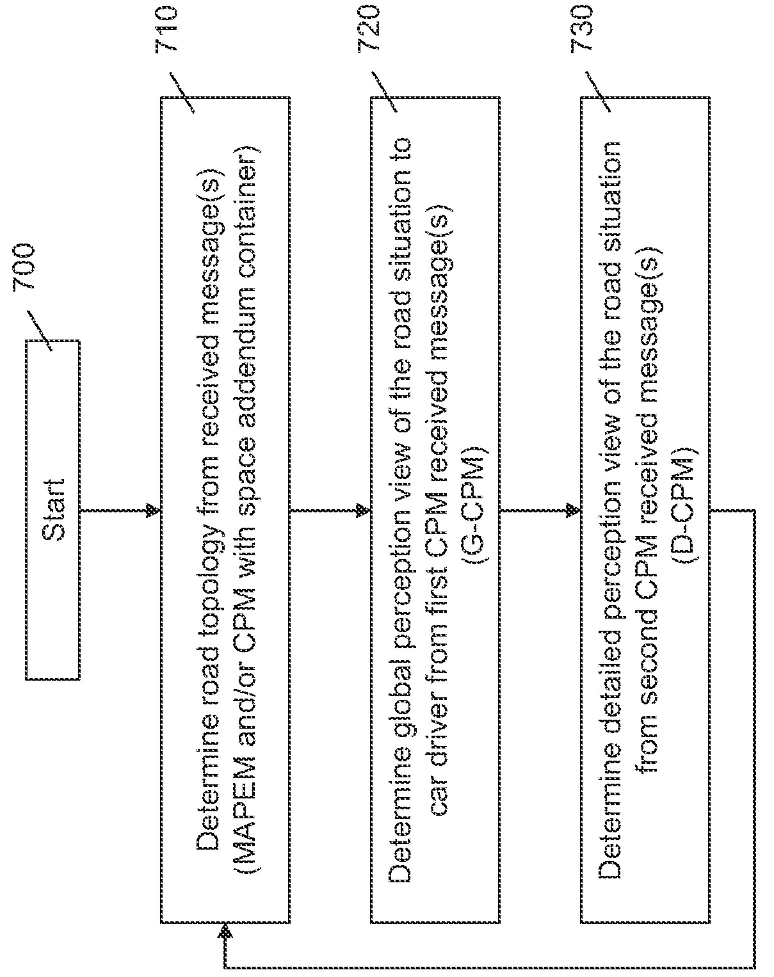
FIG. 7 illustrates, using a flowchart, more detailed steps of the method at the receiving ITS-S according to embodiments of the present disclosure.

FIG. 7 illustrates, using a flowchart, main steps of a method at the receiving ITS-S according to embodiments of the present disclosure.

In step 700, the process starts to collect the received messages such as MAPEM, CPM.

In step 710, the unit 110 retrieves the road topology from the storage unit 250 refreshed from the received MAPEM messages and CPM messages including Space Addendum Container by the unit 112.

In step 720, the unit 110 determines a global perception view of the road situation by analyzing only the CPM messages including Space Addendum Container of parent space(s). Such Space Addendum Container can be selected using the lack of the DE SpaceParentID.

In FIG. 1, the CPM messages 130, 131 and 132 including respectively Space Addendum Containers of parent spaces 170, 171 and 172 are received by the vehicle 150. It permits to obtain a space perception of road segments 160,161 and 162 as reported by the forms 180, 181 and 182. The SpaceState of each parent space permit to globally perceive the road traffic jam. The SpaceState of space 170 and 172 have default value "normal", the corresponding form 180 and 182 are white colored. While the SpaceState of space 171 has value '1', abnormal, indicating that the space is not operating normally, the corresponding form 181 is grey colored. Using the representation with the forms 180, 181 and 182, the global perception of the road situation is shown as it can be perceived by the driver of vehicle 150 using the present disclosure.

In step 730, the unit 110 determines a detailed perception view of the road situation by analyzing only the CPM messages including Space Addendum Container of child space(s). Such Space Addendum Container can be selected using the presence of the DE SpaceParentID.

In FIG. 1, the CPM messages 131*a* and 131*b* including respectively Space Addendum Containers of child spaces 171*a* and 171*b* are received by the vehicle 150. It permits to obtain sub-space perception of road segment 161 as shown the forms 181*a* and 181*b*. The SpaceState of each child space permit to perceive details of the road traffic jam. The SpaceState of space 171*a* and 171*b* have default value "normal", for example indicating an empty space or an occupied space operating normally, the corresponding form 181*a* and 181*b* are white colored while the SpaceState of space 171 has value '1', abnormal, indicating that the road part is not operating normally, the corresponding form 181 is grey colored. The forms 181, 181*a* and 181*b* are representing the detailed perception of the road situation as it can be seen for the driver of vehicle 150 using the present disclosure.

FIG. 8 illustrates another scenario for an implementation of embodiments of the present disclosure, where the originating ITS-S is a road side or a vehicle used to inform other vehicles in it vicinity on a merge lane road situation.

In this example, the originating ITS station, ITS-S, sending the CPM is a road-side unit, RSU. RSUs have advantageously more powerful resources to monitor a road segment situation than moving vehicles: for example, it may have a wider field of view, multiple fields of view, fast access to other information such as traffic conditions, traffic light status, knowledge of objects that populate the monitored area, etc.

In particular, a better view of the monitored area allows an RSU to determine the space occupancy according to the road topology with a better confidence as it's static ITS-S station positioned at a relevant traffic observation point.

ITS 800 is implemented in order to monitor road trunks involved in a merging lane at an entrance of a motorway. It comprises a fixed road side unit 110, and several entities, such that all these entities may carry or comprise ITS station (ITS-S) each, for transmitting and/or receiving ITS messages within ITS 800. The several entities may be for example vehicles 822, 823, 824, and 825. The vehicles 822, 824 and 825 are moving on lanes 862, and 863 while the vehicle 823 is on the entrance lane 861. In this road situation, it's difficult for the driver of vehicle 823 to perceive the global situation of the road trunks 860, 862 and 863. Similarly, the driver of vehicle 825 is not aware of the intention of the driver of vehicle 823 to enter in the motorway. Without the present disclosure, the merge operation is at risk.

The vehicle 825 transmits periodically it parameters using CAM 840 and can contribute to the collection perception by transmitting CPM 834.

Fixed road side unit 110 includes a set of sensors, such as image sensors here illustrated by the video camera 120, an analytic module 111 to analyze data provided by the sensors, such as a Situation Analysis module. Video camera 120 is configured to monitor or scan a monitored area, here the road topology, and thus produces images of the monitored area.

The sensors and the analytic module 111, i.e. video camera 120 and Situation Analysis module, are connected so that the Situation Analysis module processes the stream captured by the sensors/video cameras. According to some embodiment, the analytic module 111 and the sensors may be separate from or embedded within the same physical road side unit 110. For example, the analytic module 111 may be wire-connected to the sensors that may be remote (i.e. not embedded in road side unit 110).

The processing by the analytic module 111, e.g. Situation Analysis module, aims at detecting objects potentially present in the monitored area, referred to as "perceived objects" or "detected objects" hereinafter. Mechanisms to detect such objects are well-known by one skilled in the art.

The analytic module 111, e.g. Situation Analysis module, is also configured to output a list of the perceived objects respectively associated with corresponding description information referred to as "state vector". The state vector for a perceived object may include for instance parameters such as position, kinematic, temporal, behavioural or object type classification information, etc.

Therefore, the analytic module 111 may also identify, among the perceived objects, such as pedestrians, cyclists as well as. It may also identify objects such as trees, road construction/work equipment (road barrier, . . . ), and so on.

For example, in the illustrated example, by scanning the monitored area, the Situation Analysis module may perceive the following objects 822, 823, 824, and 825 corresponding to vehicles on the roadway.

Further, the perceived objects may be classified, for example, according to whether the ITS station is a vehicle, a pedestrian, or a road side unit, or of another type. Such object type classification may be based for example on predetermined rules, provided during the setting up of road side unit 110, or more generally the ITS-S. ETSI TR 103 562 V2.1.1 defines for instance the categories "unknown", "vehicle", "person", "animal" and "other". Of course, other categories, more specific, can be defined.

The analytic module has some analysis function to analyze the monitored area of the perceived objects and is able to determine objects occupancy on various spaces. In FIG. 1, road segments 860, 861,862 and 863 are monitored as spaces 810, 811, 812 and 813.

The geometry of spaces is equal to the area defined in the map data of the monitored road. The map data are locally stored in storage 250 and/or broadcasted using MAPEM messages. The analytic module 111 is able to determine a space state (SpaceState) for a monitored space.

The space state value is determined according to the road rule (named road type). The road type is available as map data either received by MAPEM 839 of locally stored in storage 250. In FIG. 1, the road type is a merge lane.

For a merge lane,

The value '0' indicates a state free meaning that the space is empty and this space is available for merge operation.

The value '1' or greater indicates a state busy meaning that the space is occupied by a vehicle and this space is not available for merge operation.

The analysis module 111 determines:

- state of the space 810 is normal because it's not occupied by a vehicle and this space is available for merge operation.
- state of the space 811, 812 and 813 are abnormal because those spaces are occupied by a vehicle and not available for merge operation.

The analysis module 111 splits the space 811, 812 and 813 and obtains the sub-space 811*a*, 812*a* and 813*a* with state value normal indicating 'available for merge operation'.

Finally, the road side unit 110, transmits the collective perception messages resulting from the analysis module. The CPMs contain a space container with the following information:

- SpaceID, an identifier of the monitored space
- SpaceState, the value of the space state determined by the analysis module.
- SpaceParentID, the parent space in case of sub-space.
- SpaceOccupancy, number of objects detected by the analysis module.
- SpaceType, the road type as defined in the road topology information in storage 250.
- SpaceArea, the geometry of the space composed of a list of nodes and reference geographic reference point (for example e.g. WGS84 North) as defined in the standard ISO19061.

The CPM 830 reports on the space 810 with the following information set:

SpaceID=810
SpaceState=free
SpaceOccupancy=0.
SpaceType='merge lane'.
SpaceArea=road topography of the lane 860.

The CPM 831 reports on the space 811 with the following information set:

SpaceID=811

SpaceState=busy

SpaceOccupancy=1.

SpaceType='merge lane'.

SpaceArea=road topography of the lane 861.

The CPM 832 reports on the space 812 with the following information set:

SpaceID=812

SpaceState=busy

SpaceOccupancy=1.

SpaceType='merge lane'.

SpaceArea=road topography of the lane 862.

The CPM 833 reports on the space 813 with the following information set:

SpaceID=813

SpaceState=busy

SpaceOccupancy=2.

SpaceType='merge lane'.

SpaceArea=road topography of the lane 863.

Additionally, the analysis module determines three subspaces 811*a*, 812*a* and 813*a* having different state values and geometry.

Consequently,

The CPM 831*a* reports on the sub-space with the following information set:

SpaceID=811a

SpaceState=free

SpaceParentID=811

SpaceOccupancy=0

SpaceType='merge lane'.

SpaceArea=space geometry of spaces 811*a*.

The CPM 832*a* reports on the sub-space 812*a* with the following information set:

SpaceID=812a

SpaceState=free

SpaceParentID=812

SpaceOccupancy=0

SpaceType='merge lane'.

SpaceArea=space geometry of spaces 812*a*.

The CPM 833*a* reports on the sub-space 813*a* with the following information set:

SpaceID=813a

SpaceState=free

SpaceParentID=813

SpaceOccupancy=0

SpaceType='merge lane'.

SpaceArea=space geometry of spaces 813*a*.

The vehicle 825 with ITS-S on board is also reporting using CPM 834 the state of the road lane 863 using it own sensors.

The CPM 139 reports on the space 864 with the following information set:

SpaceID=864

SpaceState=busy

SpaceOccupancy=1

SpaceType='lane'.

SpaceArea=space geometry of spaces in front of vehicle 825.

The driver of vehicles 825 and 823 with ITS-S on board are able to determine globally and quickly the traffic situation in the upcoming seconds by receiving the messages MAPEM 810, CPM 830, CPM 831, CPM 832 and CPM 833. Based on those messages, the drivers of vehicles 825 and 823 are able to easily get a global perception of the road situation as illustrated by the forms 880, 881, 882 and 883 representing the traffic conditions of the upcoming lanes on the vehicle road trip considering a merge road type. Particularly, based on forms 881 and 882, the driver of vehicle 823 understands that some vehicles are present on lanes 862 and 863 limiting merge operation. The driver understands a traffic issue on lane 862 without details. It permits to get a first level of details corresponding to a global perception of the situation. By adding space state and space type (pedestrian crosswalk, merge lane) in a (Free)Space Addendum Container, CPM could be used to deliver a global perception of the road situation in a CPM.

By receiving the messages CPM 832*a* and CPM 833*a*, the driver of vehicle 823 understands in details the traffic jam situation. It permits to get a second level of details corresponding to a detailed perception of the situation. Particularly, based on forms 881*a* and 882*a*, the driver of vehicle 823 can anticipate the merge operation on road trunk 862. Similarly, the driver of vehicle 823 can anticipate the merge operation on road trunk 862 by using the CPM message 834 transmitted by the vehicle 825. By using only, the form 884, the driver of vehicle 823 can be aware of an incoming vehicle resulting as an occupancy on the merge lane. This information may be obtained, in some cases, without road side unit 110 and by using only vehicle-to-vehicle communication. CPM messages having Space Addendum Container 830, 831, 832, 833 are also named G-PCM meaning Global Collective Perception Message according to FIG. 6. CPM messages having Space Addendum Container 830*a*, 831*a* and 832*a* are also named D-PCM meaning Detailed Collective Perception Message according to FIG. 6.

In this use case, the vehicle 823 is not able to determine by itself the safety conditions to enter on the highway because it requires to evaluate all vehicles positions, speeds and possibilities which can interfere during the incoming merge operation. A roadside unit 110 specifically reports on the merge lane situation by monitoring free and busy spaces corresponding to lanes parts. This space state reporting should speed up the analysis of the situation for the vehicles approaching to the lane merge zone. Using this information, the vehicle 823 can estimate the 'merging possibility', anticipate the merge operation and adapt its speed accordingly. Also, other vehicles are informed on the merge lane conditions and adapt their behavior to facilitate the merge operation. As a result, the vehicles could be warned of the merge lane state and how to proceed safely.

The ITS-S receiver can then use the state information of the Space Areas included in the CPM from R-ITS-S to have an overall state of the road topology and to have a quicker analysis of the situation to prepare for a lane merging operation as illustrated in this use case.

Considering merge lane use case, the space state indication can be used to report on available free and busy sections of lanes on this specific road topology area. When receiving such a message, a vehicle (V) concerned by a possible merge operation can take appropriate measures to estimate potential safety risk and operate accordingly.

FIG. 9 illustrates another scenario for an implementation of an embodiment of the present disclosure, where the originating ITS-S is a road side unit vehicle monitoring a parking area to report globally and in detail the position of free places.

The vehicle 940 is looking for a free place in parking area where C-ITS is operating and configured to monitor the parking places using the present disclosure. Using the present disclosure, the unit 110 is able to deliver the parking map data using MAPEM 910 delivering the global geometry of the parking area. The unit 110 globally reports on the state of blocks of free or occupied places using CPM having Space Addendum Container 930, 931, 932, 933 and 934 by providing SpaceState of space 980, 981, 982, 983 and 984 used to report on block of busy places 950, 951, 953, 954, 955, 956, 957, 958, 959 and 960, reported globally according to embodiments of the present disclosure. Also, the unit 110 specifically reports on places using CPM having Space Addendum Container 930*a*, 931*a* and 932*a* by providing SpaceState of sub-space 980*a*, 981 *a* and 982*a* used to report on block of free places 951, 954 and 958 according to embodiments of the present disclosure. Additionally, the unit 110 can report on specific place like reserved place for vehicle for disabled person 956, considered as space 984, by using a SpaceType 'reserved for disabled person'. Using this SpaceType, the vehicle 940 is informed on this specificity. CPM messages having Space Addendum Container 930, 931, 932, 933 and 934 are also named G-PCM meaning Global Collective Perception Message according to FIG. 6. CPM messages having Space Addendum Container 930*a*, 931*a* and 932*a* are also named D-PCM meaning Detailed Collective Perception Message according to FIG. 6.

Finally, the vehicle 940 gets a global and detailed perception of the available places in the parking area so he can drive stress less and decides where to go inside the various blocks to park his vehicle.

The present disclosure also permits to assist driver of vehicle for disabled people by reporting specifically on reserved place and informing other driver that some places are reserved for this purpose.

FIG. 14 illustrates another scenario for an implementation of an embodiment of the present disclosure, where the originating ITS-S is a road side unit monitoring a road intersection area to report presence of pedestrians over crosswalks.

Considering pedestrian crosswalk use case, the space state indication can be used to report on presence or not of pedestrians on a crosswalk space area. When receiving such a message, a vehicle (V) approaching the concerned crosswalk is able to estimate safety risk by knowing if at least a pedestrian is present in the corresponding area.

The road intersection 1400 is composed of four different pedestrian crosswalks 1422, 1424, 1426 and 1428. The vehicle 1401, 1402, 1403, 1404, 1405, 1406, 1407, 1408 are going over the intersection 1400. Pedestrians 1410 and 1411, also named Vulnerable Road Units (VRUs), are crossing the road using the pedestrian crosswalk 1424. The pedestrians 1412, 1413 and 1414 are crossing the road using the pedestrian crosswalk 1428. A group of pedestrians 1415 is by the roadside at the road intersection expecting to cross the road using the pedestrian crosswalk 1426.

The unit 110, where C-ITS is operating, is configured to monitor pedestrian crosswalks according to some embodiments of the present disclosure. According to such embodiments, the unit 110 is configured to deliver the road intersection map data using MAPEM 1400 delivering the global geometry of the road intersection area.

The unit 110 reports on the state of pedestrian crosswalks, a state being either free or busy, using CPMs 1430, 1431, 1432 and 1433 having Space Addendum Container 1480, 1481, 1482 and 1483 by providing SpaceState of spaces 1421, 1423, 1425 and 1427 used to report on presence of pedestrians on each pedestrian crosswalk 1422, 1424, 1426 and 1428. Additionally, sensors 1490, 1491 and 1492 can be connected to analytic module 111 and used to monitor all pedestrian crosswalks of the road intersection. The vehicle 1402 intends to turn on right using trajectory 1440 in the road intersection 1400. The trajectory 1440 crosses the pedestrian crosswalk 1428. The vehicle 1402 is informed by CPM 1433 that the space 1427 with SpaceType equals to 'pedestrian crosswalk' is busy. By receiving CPM 1430, 1431, 1432 and 1433, a vehicle is able to determine the presence or not of pedestrians over the different pedestrian crosswalks 1422, 1424, 1426 and 1428. The element 1484 illustrates the perception of the different pedestrian crosswalks 1422, 1424, 1426 and 1428 of the road section 1400 by receiving only four messages CPM 1430, 1431, 1432 and 1433.

In this use case, the vehicle 1402 is not able to determine by itself the safety conditions to turn on the right in an intersection due to lake of visibility on the crosswalk 1428. A roadside unit 110 specifically reports on the different pedestrian crosswalks areas by indicating the presence or not of pedestrians over each crosswalk using a single state indication (free or busy). Using only 4 space containers, the road side unit delivers the perception of the pedestrians over each crosswalk 1422, 1424, 1426 and 1428.

Using this information, the vehicle 1402 can estimate the risk to cross the crosswalk 1428 without ambiguity by getting directly the crosswalk occupancy in one CPM.

The FreeSpace Addendum Container is only able to report on free spaces over CPM. The FreeSpace Addendum Container doesn't permit to transmit information indicating that a monitored space is busy. The busy state of a monitored space using the FreeSpace Addendum Container is only implicit. This creates an ambiguity on monitored spaces because an ITS-S receiver is not able to confirm that a monitored space is free unless the corresponding CPM is received or to confirm that the monitored space is busy as no information is received in this case. In this situation, the ITS-S receiver is not able to determine without ambiguity if the monitored space is free or busy. Using the proposed Space Addendum Container, the monitored space is always reported using CPM with a state value explicitly.

Also, by sending only few CPM indicating the state value of monitored space (being free or busy for example), The number of CPM to send can be reduced to a minimum number compared to the reporting over CPM of all objects in the monitored space. The proposed Space Addendum Container permits to report efficiently by using the same number of CPM whatever is the number of objects detected in the monitored space.

Figure 10:
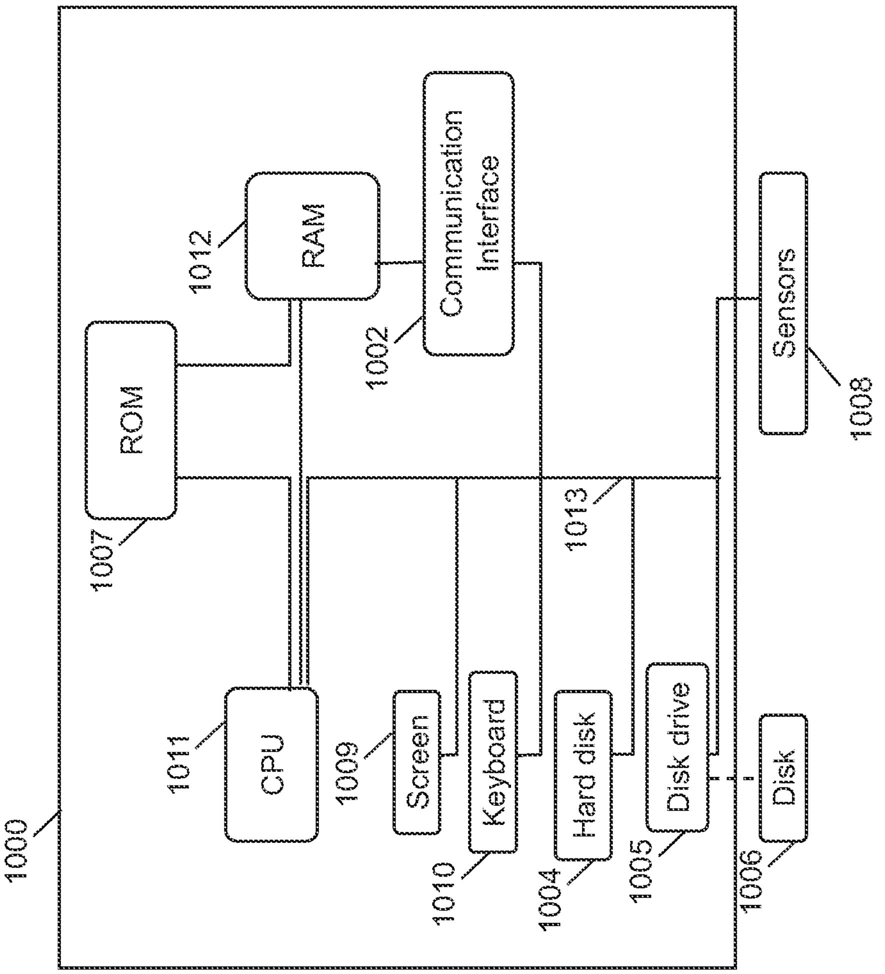
FIG. 10 shows a schematic representation of an example of a communication ITS-S device configured to implement embodiments of the present disclosure.

FIG. 10 shows a schematic representation an example of a communication ITS-S device configured to implement embodiments of the present disclosure. It may be either an ITS-S embedded in a vehicle or in a road side unit 120.

The communication device 1000 may preferably be a device such as a micro-computer, a workstation or a light portable device embedded in the vehicle or RSU. The communication device 900 comprises a communication bus 1013 to which there are preferably connected:

- a central processing unit 1011, such as a microprocessor, denoted CPU or a GPU (for graphical processing unit);
- a read only memory 1007, denoted ROM, for storing computer programs for implementing the present disclosure;
- a random access memory 1012, denoted RAM, for storing the executable code of methods according to embodiments of the present disclosure as well as the registers adapted to record variables and parameters necessary for implementing methods according to embodiments of the present disclosure; and
- at least one communication interface 1002 connected to the radio V2X communication network over which ITS messages are transmitted. The ITS messages are written from a FIFO sending memory in RAM 1012 to the network interface for transmission or are read from the network interface for reception and writing into a FIFO receiving memory in RAM 1012 under the control of a software application running in the CPU 1011.

Optionally, the communication device 1000 may also include the following components:

a data storage means 1004 such as a hard disk, for storing computer programs for implementing methods according to one or more embodiments of the present disclosure;

a disk drive 1005 for a disk 1006, the disk drive being adapted to read data from the disk 906 or to write data onto said disk;

a screen 1009 for serving as a graphical interface with the user, by means of a keyboard 910 or any other pointing means.

The communication device 1000 may be optionally connected to various peripherals including perception sensors 1008, such as for example a digital camera, each being connected to an input/output card (not shown) so as to supply data to the communication device 1000.

Preferably the communication bus provides communication and interoperability between the various elements included in the communication device 1000 or connected to it. The representation of the bus is not limiting and in particular the central processing unit is operable to communicate instructions to any element of the communication device 1000 directly or by means of another element of the communication device 1000.

The disk 1006 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the present disclosure to be implemented.

The executable code may optionally be stored either in read-only memory 1007, on the hard disk 1004 or on a removable digital medium such as for example a disk 1006 as described previously. According to an optional variant, the executable code of the programs can be received by means of the communication network, via the interface 1002, in order to be stored in one of the storage means of the communication device 1000, such as the hard disk 1004, before being executed.

The central processing unit 1011 is preferably adapted to control and direct the execution of the instructions or portions of software code of the program or programs according to the present disclosure, which instructions are stored in one of the aforementioned storage means. On powering up, the program or programs that are stored in a non-volatile memory, for example on the hard disk 1004 or in the read only memory 1007, are transferred into the random access memory 1012, which then contains the executable code of the program or programs, as well as registers for storing the variables and parameters necessary for implementing the present disclosure.

In a preferred embodiment, the apparatus is a programmable apparatus which uses software to implement the present disclosure. However, alternatively, the present disclosure may be implemented in hardware (for example, in the form of an Application Specific Integrated Circuit or ASIC).

Although the present disclosure has been described hereinabove with reference to specific embodiments, the present disclosure is not limited to the specific embodiments, and modifications will be apparent to a skilled person in the art which lie within the scope of the present disclosure.

Many further modifications and variations will suggest themselves to those versed in the art upon making reference to the foregoing illustrative embodiments, which are given by way of example only and which are not intended to limit the scope of the present disclosure, that being determined solely by the appended claims. In particular, the different features from different embodiments may be interchanged, where appropriate.

Each of the embodiments of the present disclosure described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of communication in an Intelligent Transport System, ITS, comprising, at an originating ITS station:

reporting in a collective perception message (CPM), an element describing a space, the element comprising a field indicating a state of the space, and comprising another field indicating an occupancy of the space, as a number of all currently perceived objects in the space, wherein the element comprises an identifier of space indicating that the space is a sub part of a parent space, and not reporting a CPM that describes a state of the sub part if the state of the sub part is the same as the parent space.

* * * * *